US009766715B2

(12) United States Patent
Fujimaki et al.

(10) Patent No.: US 9,766,715 B2
(45) Date of Patent: Sep. 19, 2017

(54) HEAD-MOUNT TYPE DISPLAY DEVICE, CONTROL SYSTEM, METHOD OF CONTROLLING HEAD-MOUNT TYPE DISPLAY DEVICE, AND COMPUTER PROGRAM

(71) Applicant: SEIKO EPSON CORPORATION, Tokyo (JP)

(72) Inventors: Yutaka Fujimaki, Matsumoto (JP); Masahide Takano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 221 days.

(21) Appl. No.: 14/682,409

(22) Filed: Apr. 9, 2015

(65) Prior Publication Data
US 2015/0317518 A1    Nov. 5, 2015

(30) Foreign Application Priority Data

May 1, 2014   (JP) ................................ 2014-094613
Feb. 12, 2015   (JP) ................................ 2015-024971

(51) Int. Cl.
*G06K 9/00*   (2006.01)
*G02B 27/01*   (2006.01)
(Continued)

(52) U.S. Cl.
CPC ......... *G06F 3/0304* (2013.01); *G02B 27/017* (2013.01); *G06F 3/011* (2013.01); *G06F 3/017* (2013.01); *G06K 9/00671* (2013.01); *G06T 19/006* (2013.01); *G08C 17/02* (2013.01); *G02B 2027/0178* (2013.01);
(Continued)

(58) Field of Classification Search
None
See application file for complete search history.

(56) References Cited

U.S. PATENT DOCUMENTS 6,677,969 B1    1/2004   Hongo
2005/0288934 A1   12/2005   Omi
(Continued)

FOREIGN PATENT DOCUMENTS

JP    H05-268678 A    10/1993
JP    2000-148381 A    5/2000
(Continued)

*Primary Examiner* — Michelle Chin
(74) *Attorney, Agent, or Firm* — Oliff PLC

(57) ABSTRACT

A transmissive head-mount type display device includes an image display section adapted to display a virtual image, and capable of transmitting an external sight, an object acquisition section adapted to obtain a selectable object located in a predetermined distance range from the image display section, and a position of a specific object included in the external sight, and a control section adapted to display an object-correspondence virtual image associated with the object obtained as the virtual image using the image display section, identify a change in the position of the specific object based on the position of the specific object obtained, select the object based on a relationship between the change in the position of the specific object identified and a position of the object obtained, and display a specific check image associated with the object selected as the virtual image using the image display section.

22 Claims, 17 Drawing Sheets

(51) Int. Cl.
*G06T 19/00* (2011.01)
*G06F 3/03* (2006.01)
*G06F 3/01* (2006.01)
*G08C 17/02* (2006.01)

(52) U.S. Cl.
CPC ........ *G02B 2027/0198* (2013.01); *G05B 2219/23148* (2013.01); *G05B 2219/2642* (2013.01); *G08C 2201/30* (2013.01); *G08C 2201/32* (2013.01)

(56) References Cited

U.S. PATENT DOCUMENTS

2012/0294478 A1* 11/2012 Publicover ......... G06K 9/00604
382/103
2013/0257720 A1 10/2013 Noda et al.
2013/0314303 A1* 11/2013 Osterhout ............... G06F 3/005
345/8

FOREIGN PATENT DOCUMENTS

| | | | |
|---|---|---|---|
| JP | 2000-163196 A | 6/2000 |
| JP | 2005-069734 A | 3/2005 |
| JP | 2006-048628 A | 2/2006 |
| JP | 2013-205983 A | 10/2013 |

* cited by examiner

|  | TELEVISION SET | | ... |
| --- | --- | --- | --- |
|  | CONTROL APPARATUS | CONTROLLER | ... |
| THREE-DIMENSIONAL MODEL | | | ... |
| POSITION COORDINATE | xxx.xxxx1<br>yyy.yyyy1<br>zzz.zzzz1 | xxx.xxxx2<br>yyy.yyyy2<br>zzz.zzzz2 | ... |
| DISPLAY INFORMATION | POWER ON / OFF<br>VOLUME + / −<br>CHANNEL + / −<br>OTHERS | | ... |

FIG.15

HEAD-MOUNT TYPE DISPLAY DEVICE, CONTROL SYSTEM, METHOD OF CONTROLLING HEAD-MOUNT TYPE DISPLAY DEVICE, AND COMPUTER PROGRAM

BACKGROUND

1. Technical Field

The present invention relates to a technology of head-mount type display devices.

2. Related Art

A head-mount type display device (a head mounted display (HMD)) as a display device to be mounted on the head has been known. The head-mount type display device generates image light representing an image using, for example, a liquid crystal display and a light source, and then guides the image light thus generated to the eyes of the user using a projection optical system and a light guide plate to thereby make the user visually recognize a virtual image. The head-mount type display device includes two types, namely a transmissive type with which the user can visually recognize the external sight in addition to the virtual image, and a non-transmissive type with which the user is not allowed to visually recognize the external sight. The transmissive head-mount type display device includes an optical transmissive type and a video transmissive type.

JP-A-5-268678 (Document 1) discloses a device control system in which display control data related to a control command having been received by a control target device for receiving the control command having been transmitted from a controller is transmitted to the controller to thereby perform bidirectional data transmission/reception between the controller and the control target device. JP-A-2000-148381 (Document 2) discloses an input image processing method in which when a fingertip of the user as a predetermined mark is included in an imaged range equivalent to or larger than the visual field of the user, the coordinate value of the fingertip is output to thereby perform a control process corresponding to the position of the fingertip. JP-A-2013-205983 (Document 3) discloses an information input method of operating a control target device based on an external sight imaged by a binocular camera and the position and the posture of the hand of the user thus imaged. JP-A-2006-48628, JP-A-2005-69734, and JP-A-2000-163196 are other examples of the related art.

However, in the technology described in Document 1, in the case in which a plurality of control target devices exists, it is unachievable for the user to perform control with an intuitive operation in order for the user to control either of the control target devices. Therefore, there has been a problem that the usability needs to be improved. Further, in the technology described in Document 2, the user needs to continue to fix the position of the fingertip until the control target device to the object is selected, which incurs fatigue of the user. Therefore, there has been a problem that the usability needs to further be improved. Further, in Document 3, although the control target device is operated based on the position and the posture of the hand, there has been a problem that it is necessary to operate the control target device taking additional information into consideration to thereby more intuitively operate the control target device.

SUMMARY

An advantage of the invention is to solve at least a part of the problems described above, and the invention can be implemented as the following aspects.

(1) An aspect of the invention provides a transmissive head-mount type display device. The head-mount type display device includes an image display section adapted to display a virtual image, and capable of transmitting an external sight, an object acquisition section adapted to obtain a selectable object located in a predetermined distance range from the image display section, and a position of a specific object included in the external sight, and a control section adapted to display an object-correspondence virtual image associated with the object obtained as the virtual image using the image display section, identify a change in the position of the specific object based on the position of the specific object obtained, select the object based on a relationship between the change in the position of the specific object identified and a position of the object obtained, and display a specific check image associated with the object selected as the virtual image using the image display section. According to the head-mount type display device having this configuration, it is possible for the user to visually recognize the object as an object of the operation and the control associated with the change in the position of the specific object detected at the same time without changing the eye direction, and to intuitively perform the control of the object, and thus the convenience of the user is improved.

(2) In the head-mount type display device according to the aspect described above, the object acquisition section may include an imaging section adapted to image the external sight, and an image detection section adapted to detect and obtain the position of the specific object and the object included in the external sight imaged, and the control section may determine control of the object selected, and then executes the control of the object determined. According to the head-mount type display device having this configuration, the specific object and the object can be obtained by imaging, and at the same time, the user can visually recognize the specific object and the object thus imaged, and therefore, it is easy to recognize the object.

(3) In the head-mount type display device according to the aspect described above, the control section may display the object-correspondence virtual image associated in advance with a combination of the position of the specific object obtained and the object obtained as the virtual image using the image display section. According to the head-mount type display device having this configuration, it is possible for the user to recognize the change in the position of the specific object necessary for executing the control of the object as visual information, and thus, the usability of the head-mount type display device for the user is improved.

(4) In the head-mount type display device according to the aspect described above, the control section may display the virtual image representing the change in the position of the specific object necessary for executing the control of the object as the object-correspondence virtual image associated in advance with the combination of the position of the specific object obtained and the object obtained using the image display section. According to the head-mount type display device having this configuration, since it is possible for the user to recognize the content of the control of the object to subsequently be performed in accordance with the change in the position of the own specific object as the visual information, the usability for the user is improved.

(5) In the head-mount type display device according to the aspect described above, the control section may display the virtual image representing a content of the control of the object to be executed as the object-correspondence virtual image associated in advance with the object obtained using the image display section. According to the head-mount type display device having this configuration, since it is possible for the user to recognize the content of the control of the object to subsequently be performed in accordance with the change in the position of the specific object as the visual information, the usability for the user is improved.

(6) In the head-mount type display device according to the aspect described above, in a case in which the position of the specific object having been changed and the object overlap each other in the external sight imaged, the control section may determine the control of the object associated in advance with the object overlapping the position of the specific object having been changed. According to the head-mount type display device having this configuration, since there is executed the control of the object corresponding to the object overlapped by the specific object after the position of the specific object has been changed, it is easy for the user to perform the modification of the specific object corresponding to the control of the intended object.

(7) In the head-mount type display device according to the aspect described above, the head-mount type display device may further include a distance identification section adapted to identify a distance between the object obtained and the image display section, and the control section may set the object, which has been obtained, and has the distance identified equal to or shorter than a threshold value, as the selectable object. According to the head-mount type display device having this configuration, in the case in which a plurality of tentative objects has been detected in the taken image, those located near to the user are set as the selectable objects. Therefore, since the user is made to visually recognize these having a high possibility of being selected by the user, the convenience of the user is enhanced.

(8) In the head-mount type display device according to the aspect described above, that the head-mount type display device may further include a sound acquisition section adapted to obtain an external sound, and the control section may determine the control of the object based on a combination of the change in the position of the specific object identified and the sound obtained. According to the head-mount type display device having this configuration, since the control of the object is executed in accordance with the combination of the change in the position of the specific object and the sound, it is possible for the user to intuitively perform the control of a larger number of objects compared to the control of the object executed in accordance only with the change in the position of the specific object.

(9) In the head-mount type display device according to the aspect described above, the object acquisition section may obtain position information of at least one the objects from another device. According to the head-mount type display device having this configuration, it is possible to recognize the position of the selectable object in a range which the user cannot visually recognize, and thus the usability for the user is improved.

(10) In the head-mount type display device according to the aspect described above, in a case in which the object obtained fails to be included in the external sight, the control section may display a positional relationship between the image display section and the object obtained as the virtual image using the image display section. According to the head-mount type display device having this configuration, it is possible to visually recognize the positional relationship between the position of the selectable object in the range, which the user cannot visually recognize, and the user as a virtual image, and thus the usability for the user is further improved.

(11) In the head-mount type display device according to the aspect described above, the control section may detect the acceleration of the specific object, and identify the change in the position of the specific object based on the acceleration of the specific object detected. According to the head-mount type display device having this configuration, in the case in which the user executes the control instruction to the object selected, it is not required to operate a specific place or to perform an action associated with the operation in the range to be imaged, and thus, the usability for the user is improved.

(12) In the head-mount type display device according to the aspect described above, that the heat-mount type display device may further include a sound acquisition section adapted to obtain an external sound, and the control section may determine the control of the object selected, based on the external sound obtained and a combination of the change in the position of the specific object identified. According to the head-mount type display device having this configuration, since the control to the selected object is determined based on a plurality of elements, namely the sound and the change in the position of the specific object, the user can input a larger number of operations, and thus, the usability for the user is improved.

(13) In the head-mount type display device according to the aspect described above, the control section may execute control of a control device associated with the object selected, and in a case in which the object selected and the control device are obtained in the external sight, the control section may display, as the virtual image using the image display section, that the object selected and the control device are in a correspondence relationship. According to the head-mount type display device having this configuration, it is possible to make the correspondence relationship between the selectable object detected and the specific object detected be visually recognized, and thus, the usability for the user is improved.

(14) In the head-mount type display device according to the aspect described above, the control section may display virtual images having identical shapes and identical colors using the image display section as the virtual image representing that the object selected and the control device are in the correspondence relationship. According to the head-mount type display device having this configuration, it is possible to make the correspondence relationship between the selectable object detected and the specific object detected be visually recognized in a more articulate manner, and thus, the usability for the user is improved.

(15) In the head-mount type display device according to the aspect described above, the head-mount type display device may further include an identifying section adapted to identify an attribute of a user of the image display section, and the control section may display at least one of a virtual image associated with the object and the specific check image as the virtual image using the image display section so as to correspond to the attribute identified. According to the head-mount type display device having this configuration, since the virtual image different by the user identified is generated in the image display section, the information meeting the needs of the user can be provided.

All of the constituents provided to each of the aspects of the invention described above are not necessarily essential, and in order to solve all or a part of the problems described above, or in order to achieve all or a part of the advantages described in the specification, it is possible to arbitrarily make modification, elimination, replacement with another new constituent, partial deletion of restriction content on some of the constituents. Further, in order to solve all or apart of the problems described above, or in order to achieve all or a part of the advantages described in the specification, it is also possible to combine some or all of the technical features included in one of the aspects of the invention with some or all of the technical features included in another of the aspects of the invention to thereby form an independent aspect of the invention.

For example, an aspect of the invention can be implemented as a device provided with some or all of the three elements, namely the image display section, the object acquisition section, and the control section. In other words, it is also possible for the device to include or not to include the image display section. Further, it is also possible for the device to include or not to include the object acquisition section. Further, it is also possible for the device to include or not to include the control section. It is also possible for the image display section to, for example, display a virtual image, and to be capable of transmitting the external sight. It is possible for the object acquisition section to obtain, for example, a selectable object located in the predetermined distance range from the image display section, and the position of the specific object included in the external sight. It is possible for the control section to, for example, display an object-correspondence virtual image associated with the object obtained as the virtual image using the image display section, identify a change in the position of the specific object based on the position of the specific object obtained, select the object based on a relationship between the change in the position of the specific object identified and a position of the object obtained, and display a specific check image associated with the object selected as the virtual image using the image display section. Such a device can be realized as, for example, a head-mount type display device, but can also be realized as a device other than the head-mount type display device. According to such an aspect of the invention, it is possible to solve at least one of a variety of problems such as improvement in operability and simplification of the device, integration of the device, and enhancement of convenience of the user using the device. Some or all of the technical features of the head-mount type display device described above as each of the aspects of the invention can be applied to this device.

The invention can be implemented in various forms other than the head-mount type display device. The invention can be implemented in the forms such as a display device, a method of controlling a display device or a head-mount type display device, a control system, a head-mount type display system, a computer program for realizing the function of the control system and the display device, a recording medium storing the computer program, and a data signal including the computer program and embodied in a carrier wave.

BRIEF DESCRIPTION OF THE DRAWINGS

The invention will be described with reference to the accompanying drawings, wherein like numbers reference like elements.

FIG. 15 is a schematic diagram showing a part of information of a control device stored in a storage section of a server.

DESCRIPTION OF EXEMPLARY EMBODIMENTS

Then, some embodiments of the invention will be explained in the following order based on some specific examples.

A. First Embodiment
   A-1. Configuration of Head-Mount Type Display Device
   A-2. Device Check Process
B. Second Embodiment
C. Third Embodiment
D. Modified Examples

A. First Embodiment

A-1. Configuration of Head-Mount Type Display Device

Figure 1:
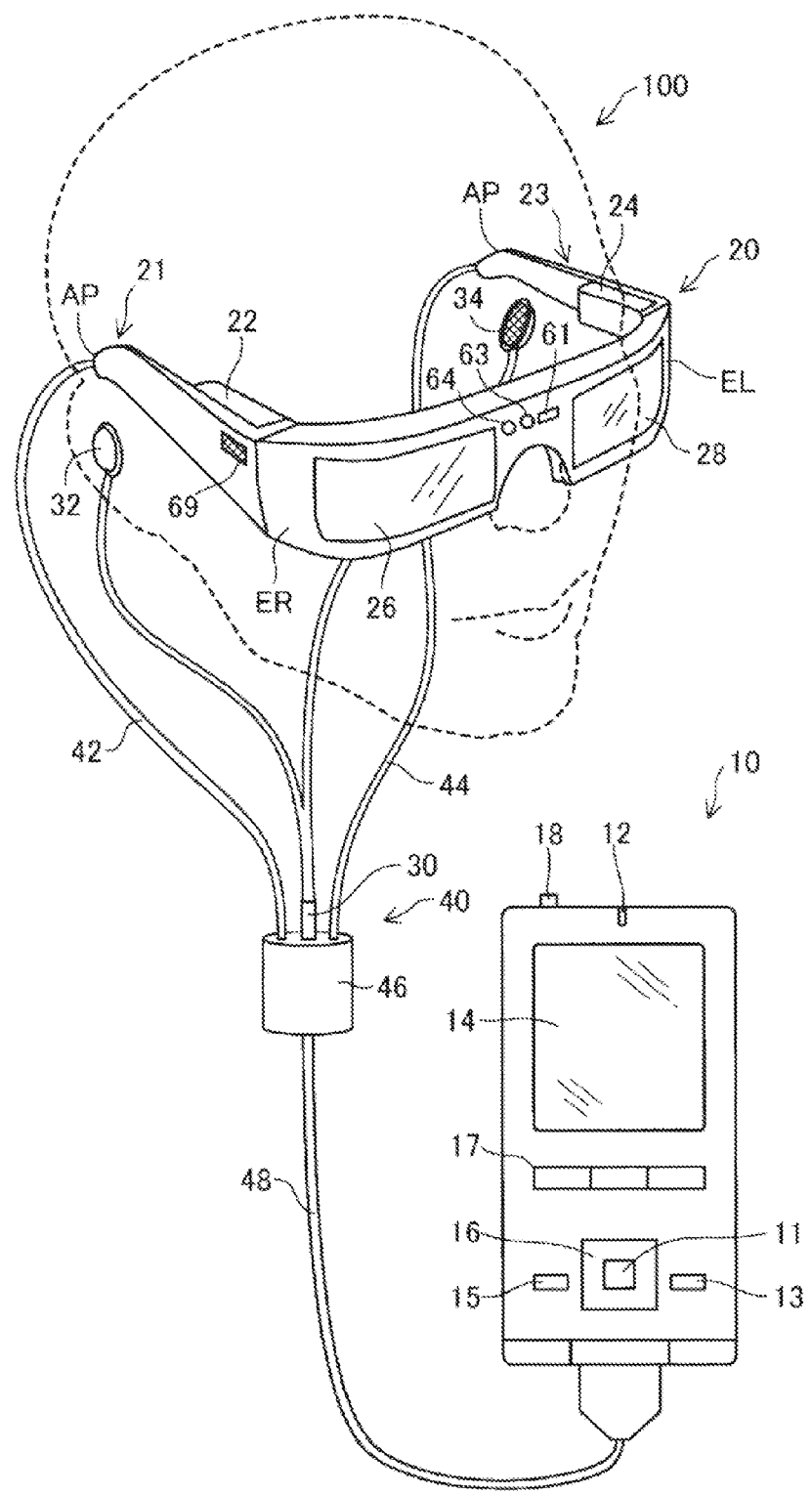
FIG. 1 is an explanatory diagram showing an exterior configuration of an HMD.

FIG. 1 is an explanatory diagram showing an exterior configuration of a head-mount type display device 100 (HMD 100). The HMD 100 is a display device to be mounted on the head, and is also called a head mounted display (HMD). The HMD 100 according to the present embodiment is an optical transmissive head-mount type display device allowing the user to visually recognize a virtual image and at the same time visually recognize an external sight directly. It should be noted that in the present specification, the virtual image to be visually recognized by the user using the HMD 100 is also referred to as a "display image" for the sake of convenience. Further, emission of the image light generated based on the image data is also referred to as "display of the image."

The HMD 100 is provided with an image display section 20 for making the user visually recognize the virtual image in the state of being mounted on the head of the user, and a control section 10 (a controller 10) for controlling the image display section 20.

The image display section 20 is a mounting body to be mounted on the head of the user, and has a shape of a pair of glasses in the present embodiment. The image display section 20 includes a right holding section 21, a right display drive section 22, a left holding section 23, a left display drive section 24, a right optical image display section 26, a left optical image display section 28, a camera 61, an infrared LED 64, a TOF sensor 63, and a microphone 69. The right optical image display section 26 and the left optical image display section 28 are disposed so as to be located in front of the right and left eyes of the user, respectively, when the user wears the image display section 20. One end of the right optical image display section 26 and one end of the left optical image display section 28 are connected to each other at a position corresponding to the glabella of the user when the user wears the image display section 20.

The right holding section 21 is a member disposed so as to extend from an end portion ER, which is the other end of the right optical image display section 26, to a temporal region of the head of the user when the user wears the image display section 20. Similarly, the left holding section 23 is a member disposed so as to extend from an end portion EL, which is the other end of the left optical image display section 28, to a temporal region of the head of the user when the user wears the image display section 20. The right holding section 21 and the left holding section 23 hold the image display section 20 in the head of the user in such a manner as the temples of the pair of glasses.

The right display drive section 22 and the left display drive section 24 are disposed on the sides to be opposed to the head of the user when the user wears the image display section 20. It should be noted that hereinafter the right holding section 21 and the left holding section 23 are also collectively referred to simply as "holding sections," the right display drive section 22 and the left display drive section 24 are collectively referred to simply as "display drive sections," and the right optical image display section 26 and the left optical image display section 28 are also collectively referred to simply as "optical image display sections."

The display drive sections 22, 24 include liquid crystal displays 241, 242 (hereinafter also referred to as "LCDs 241, 242"), projection optical systems 251, 252, and so on (see FIG. 2). The details of the configuration of the display drive sections 22, 24 will be described later. The optical image display sections 26, 28 as optical members respectively include light guide plates 261, 262 (see FIG. 2), and dimming plates. The light guide plates 261, 262 are each formed of a light transmissive resin material or the like, and guide the image light output from the display drive sections 22, 24 to the eyes of the user, respectively. Each of the dimming plates is a thin-plate like optical element, and is disposed so as to cover the obverse side of the image display section 20, which is the side opposite to the side of the eyes of the user. The dimming plates protect the light guide plates 261, 262 to suppress damages, adhesion of dirt, and so on to the light guide plates 261, 262, respectively. Further, by controlling the light transmittance of the dimming plate, an amount of the outside light entering the eye of the user is controlled, and thus, the easiness of the visual recognition of the virtual image can be controlled. It should be noted that the dimming plates can be eliminated.

The camera 61 is disposed at the position corresponding to the glabella of the user when the user wears the image display section 20. Therefore, the camera 61 takes an image of the external sight as an outside view in the eye direction of the user to obtain the taken image in the state in which the user wears the image display section 20 on the head. The camera 61 is a monocular camera, but can also be a stereo camera. The camera 61 corresponds to an imaging section in the appended claims.

The infrared LED 64 and the TOF sensor 63 is disposed at the position corresponding to the glabella of the user when the user wears the image display section 20, which is a similar position to the position of the camera 61. The infrared LED 64 is a light emitting diode (LED) for emitting an infrared ray. The TOF sensor 63 detects the reflected light, which is the infrared light emitted by the infrared LED 64 and then reflected by a specific object.

The microphone 69 is a device for obtaining an external sound. The microphone 69 is formed on the opposite side to the side opposed to the user (the outer side) in the right display drive section 22 when the user wears the image display section 20.

The image display section 20 further includes a connection section 40 for connecting the image display section 20 to the control section 10. The connection section 40 includes a main body cord 48 to be connected to the control section 10, a right cord 42, a left cord 44, and a coupling member 46. The main body cord 48 is branched into two cords to form the right cord 42 and the left cord 44. The right cord 42 is inserted into the housing of the right holding section 21 from a tip portion AP in the extending direction of the right holding section 21, and is connected to the right display drive section 22. Similarly, the left cord 44 is inserted into the housing of the left holding section 23 from a tip portion AP in the extending direction of the left holding section 23, and is connected to the left display drive section 24. The coupling member 46 is disposed at a branch point of the main body cord 48, and the right cord 42 and the left cord 44, and has a jack to which an earphone plug 30 is connected. A right earphone 32 and a left earphone 34 extend from the earphone plug 30.

The image display section 20 and the control section 10 perform transmission of various signals via the connection section 40. Connecters (not shown) to be fitted with each other are provided to an end portion of the main body cord 48 on the opposite side to the coupling member 46 and the control section 10, respectively. The control section 10 and the image display section 20 are connected to each other or separated from each other in accordance with fitting/releasing of the connector of the main body cord 48 and the connector of the control section 10. As the right cord 42, the left cord 44, and the main body cord 48, there can be adopted, for example, metal cables or optical fibers.

The control section 10 is a device for controlling the HMD 100. The control section 10 includes a determination key 11, a lighting section 12, a display switching key 13, a track pad 14, a luminance switching key 15, direction keys 16, a menu key 17, and a power switch 18. The determination key 11 detects a holding-down operation, and then outputs a signal for determining the content of the operation in the control section 10. The lighting section 12 gives notice of the operating state of the HMD 100 with the lighting state of the lighting section 12. As the operating state of the HMD 100, there can be cited, for example, an ON/OFF state of the power. As the lighting section 12, there is used, for example, an LED. The display switching key 13 detects a holding-down operation, and then outputs, for example, a signal for switching the display mode of the content moving image between a 3D mode and a 2D mode. The track pad 14 detects the finger operation of the user on the operation surface of the track pad 14, and then outputs a signal corresponding to the detection content. As the track pad 14, there can be adopted a variety of types of track pad such as an electrostatic track pad, a pressure-detection track pad, or an optical track pad. The luminance switching key 15 detects a holding-down operation to output a signal for increasing or decreasing the luminance of the image display section 20. The arrow keys 16 detect a holding-down operation to the keys corresponding to up, down, right, and left directions to output a signal corresponding to the detection content. The power switch 18 detects a sliding operation of the switch to thereby switch the powering state of the HMD 100.

Figure 2:
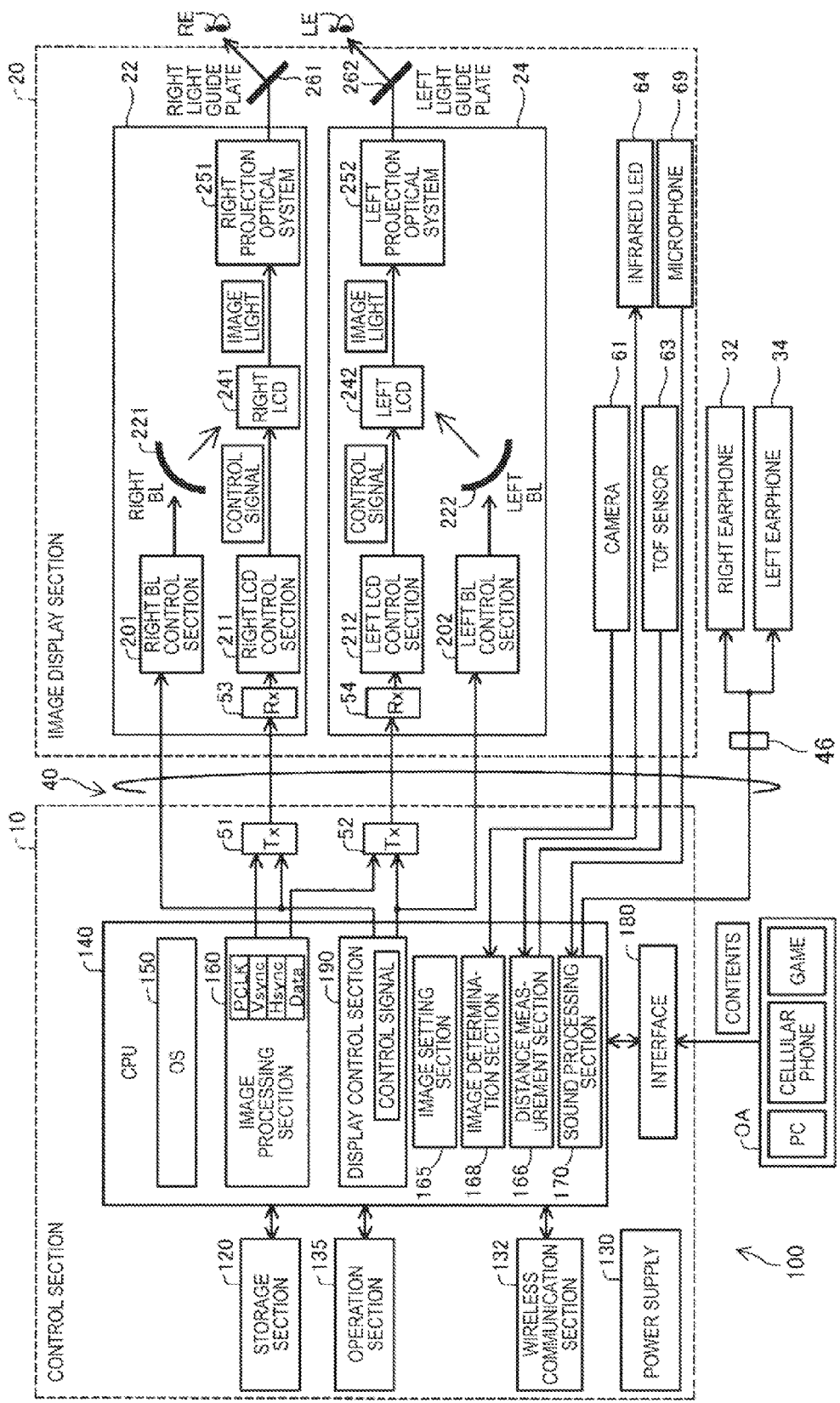
FIG. 2 is a block diagram functionally showing a configuration of the HMD.

FIG. 2 is a block diagram functionally showing a configuration of the HMD 100. As shown in FIG. 2, the control section 10 includes a storage section 120, a power supply 130, a wireless communication section 132, an operation section 135, a CPU 140, an interface 180, a transmitting section 51 (Tx 51), and a transmitting section 52 (Tx 52). The operation section 135 receives the operation by the user, and includes the determination key 11, the display switching key 13, the track pad 14, the luminance switching key 15, the direction keys 16, the menu key 17, and the power switch 18.

The power supply 130 supplies each of the sections of the HMD 100 with the electrical power. As the power supply 130, a secondary cell, for example, can be used. The storage section 120 stores a variety of computer programs. The storage section 120 includes a ROM, a RAM, and so on. Further, although the details will be described later, the storage section 120 stores image data of the operation object detected in the case of being included in the taken image taken by the camera 61, and image data of the determination object to be the basis of the determination of performing the control. Further, the storage section 120 also stores the display image to be displayed by the image display section 20 in the case in which the operation object or the like has been detected.

The CPU 140 retrieves and then executes the computer programs stored in the storage section 120 to thereby function as an operating system 150 (OS 150), a display control section 190, a sound processing section 170, an image processing section 160, an image determination section 168, a distance measurement section 166, an image setting section 165, and an interface 180.

The display control section 190 generates control signals for controlling the right display drive section 22 and the left display drive section 24. Specifically, the display control section 190 controls to switch ON/OFF the drive of a right LCD 241 by a right LCD control section 211, to switch ON/OFF the drive of a right backlight 221 by a right backlight control section 201, to switch ON/OFF the drive of a left LCD 242 by a left LCD control section 212, to switch ON/OFF the drive of a left backlight 222 by a left backlight control section 202, and so on individually using the control signals. Thus, the display control section 190 controls generation and emission of the image light by each of the right display drive section 22 and the left display drive section 24. For example, the display control section 190 makes both of the right display drive section 22 and the left display drive section 24 generate image light, makes either of them generate the image light, or inhibits the both from generating the image light.

The display control section 190 transmits the control signals to the right LCD control section 211 and the left LCD control section 212 via the transmitting sections 51, 52, respectively. Further, the display control section 190 transmits the control signals to the right backlight control section 201 and the left backlight control section 202, respectively.

The image processing section 160 obtains the image signal included in the content. The image processing section 160 separates sync signals such as a vertical sync signal VSync and a horizontal sync signal HSync from the image signal thus obtained. Further, the image processing section 160 generates a clock signal PCLK using a phase locked loop (PLL) circuit or the like (not shown) in accordance with the periods of the vertical sync signal VSync and the horizontal sync signal HSync thus separated. The image processing section 160 converts the analog image signal, from which the sync signals are separated, into a digital image signal using an A/D conversion circuit or the like (not shown). Subsequently, the image processing section 160 stores the digital image signal obtained by the conversion into a DRAM in the storage section 120 frame by frame as the image data (RGB data) of the object image. It should be noted that it is also possible for the image processing section 160 to perform image processing such as a resolution conversion process, various color correction processes of, for example, adjustment of luminance and chromaticness, or a keystone distortion correction process on the image data if necessary.

The image processing section 160 transmits each of the clock signal PCLK, the vertical sync signal VSync, the horizontal sync signal HSync thus generated, and the image data stored in the DRAM in the storage section 120, via each of the transmitting sections 51 and 52. It should be noted that the image data transmitted via the transmitting section 51 is also referred to as "right-eye image data," and the image data transmitted via the transmitting section 52 is also referred to as "left-eye image data." The transmitting sections 51, 52 function as transmitters for serial transmission between the control section 10 and the image display section 20.

The sound processing section 170 obtains a sound signal included in the content, amplifies the sound signal thus obtained, and then supplies the result to a speaker (not shown) in the right earphone 32 and a speaker (not shown)

in the left earphone 34 connected to the coupling member 46. It should be noted that in the case of, for example, adopting a Dolby (registered trademark) system, a process on the sound signal is performed, and sounds different from each other and with, for example, modified frequencies are output respectively from the right earphone 32 and the left earphone 34. The sound processing section 170 performs a variety of processes on the external sound obtained by the microphone 69. Although the details will be described later, the sound processing section 170 determines whether or not the external sound thus obtained is a determination sound to be a basis of the determination of performing a device check process stored in the storage section 120 as the variety of processes.

The image determination section 168 detects whether or not the image identical to the image data of the operation object or the determination object stored in the storage section 120 is included in the taken image using pattern matching or a statistical identification method. The image determination section 168 detects the object, which is the same image as the image data of the determination object thus detected, as the determination object. It should be noted that the image determination section 168 corresponds to an image detection section in the appended claims, and the determination object corresponds to a specific object in the appended claims.

The distance measurement section 166 is a distance image sensor for measuring the distance between the image display section 20 and the specific object by calculating the time from when the infrared ray has been emitted until the infrared ray is reflected by the specific object and then received by the TOF sensor 63 by using the TOF (time of flight) method with respect to the reflected light of the infrared ray detected by the TOF sensor 63. The distance measurement section 166 determines whether or not the distance between the specific object representing the same image as the image data of the operation object detected by the image determination section 168 and the image display section 20 is equal to or shorter than a predetermined distance set in advance. It should be noted that the distance measurement section 166, the TOF sensor 63, and the infrared LED 64 correspond to a distance identification section in the appended claims.

The image setting section 165 sets a specific object, which has a distance from the image display section 20 equal to or shorter than a predetermined distance, and represents the same image as the image data of the operation object stored in the storage section 120, as a selectable operation object. The image setting section 165 sets the selectable operation object, and then makes the image display section 20 display an image associated with the operation object stored in the storage section 120. In other words, a specific object, which has been detected by the image determination section 168 as the same image as the image data of the operation object, but has a distance from the image display section 20 exceeding the predetermined distance, is not set as the selectable operation object. Further, the image setting section 165 displays the image, which has previously been associated with the determination object thus detected, on the image display section 20. The image setting section 165 determines the control instruction, which has been set based on the change in the position of the determination object and the position of the operation object, and then performs the control instruction. It should be noted that the details of a variety of types of images to be displayed on the image display section 20 will be described later. The image setting section 165 corresponds to a control section in the appended claims. The selectable operation object in the present embodiment corresponds to a selectable object in the appended claims, and the control instruction set by the image setting section 165 corresponds to control of the object in the appended claims.

The interface 180 is an interface for connecting various external equipment OA to be a supply source of contents to the control section 10. As the external equipment OA, there can be cited, for example, a personal computer (PC), a cellular phone terminal, and a game terminal. As the interface 180, there can be used, for example, a USB interface, a micro USB interface, and an interface for a memory card.

The image display section 20 is provided with the right display drive section 22, the left display drive section 24, the right light guide plate 261 as the right optical image display section 26, the left light guide plate 262 as the left optical image display section 28, the camera 61, the TOF sensor 63, the infrared LED 64, and the microphone 69.

The right display drive section 22 includes a receiving section 53 (Rx 53), the right backlight control section 201 (right BL control section 201) and the right backlight 221 (right BL 221) functioning as the light source, the right LCD control section 211 and the right LCD 241 functioning as the display element, and a right projection optical system 251. The right backlight control section 201 and the right backlight 221 function as the light source. The right LCD control section 211 and the right LCD 241 function as the display element. It should be noted that the right backlight control section 201, the right LCD control section 211, the right backlight 221, and the right LCD 241 are also collectively referred to as an "image light generation section."

The receiving section 53 functions as a receiver for serial transmission between the control section 10 and the image display section 20. The right backlight control section 201 drives the right backlight 221 based on the control signal input to the right backlight control section 201. The right backlight 221 is a light emitter such as an LED or electroluminescence (EL). The right LCD control section 211 drives the right LCD 241 based on the clock signal PCLK, the vertical sync signal VSync, the horizontal sync signal HSync, and the right-eye image data input via the receiving section 53. The right LCD 241 is a transmissive liquid crystal panel having a plurality of pixels arranged in a matrix.

The right projection optical system 251 is formed of a collimating lens for converting the image light emitted from the right LCD 241 into a light beam in a parallel state. The right light guide plate 261 as the right optical image display section 26 guides the image light, which has been output from the right projection optical system 251, to the right eye RE of the user while reflecting the image light along a predetermined light path. It should be noted that the right projection optical system 251 and the right light guide plate 261 are also collectively referred to as a "light guide section."

The left display drive section 24 has substantially the same configuration as that of the right display drive section 22. The left display drive section 24 includes a receiving section 54 (Rx 54), the left backlight control section 202 (left BL control section 202) and the left backlight 222 (left BL 222) functioning as the light source, the left LCD control section 212 and the left LCD 242 functioning as the display element, and a left projection optical system 252. The left backlight control section 202 and the left backlight 222 function as the light source. The left LCD control section 212 and the left LCD 242 function as the display element. It should be noted that the left backlight control section 202, the left LCD control section 212, the left backlight 222, and the left LCD 242 are also collectively referred to as an "image light generation section." Further, the left projection optical system 252 is formed of a collimating lens for converting the image light emitted from the left LCD 242 into a light beam in a parallel state. The left light guide plate 262 as the left optical image display section 28 guides the image light, which has been output from the left projection optical system 252, to the left eye LE of the user while reflecting the image light along a predetermined light path. It should be noted that the left projection optical system. 252 and the left light guide plate 262 are also collectively referred to as a "light guide section."

Figure 3:
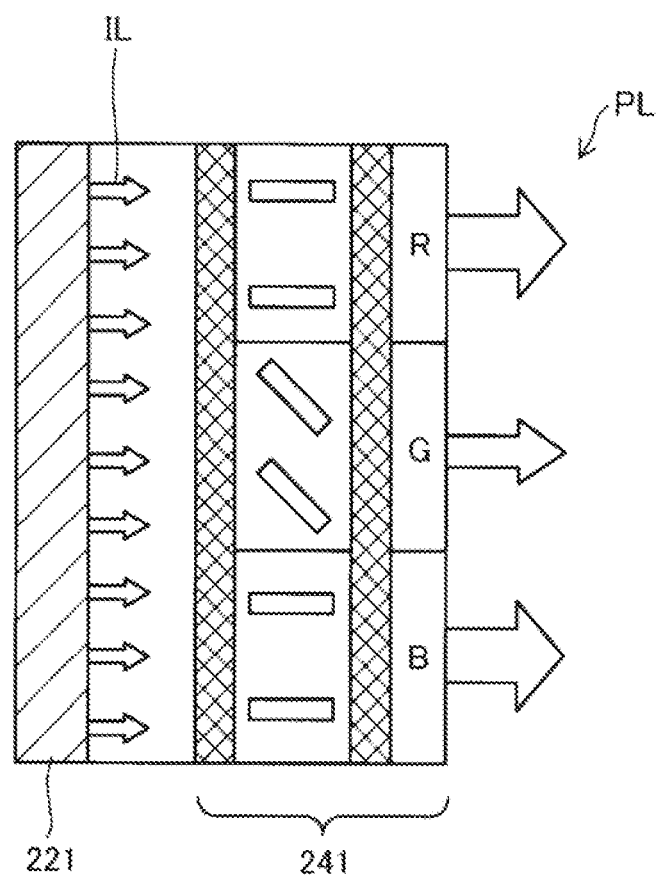
FIG. 3 is an explanatory diagram showing how image light is emitted by an image light generation section.

FIG. 3 is an explanatory diagram showing how the image light is emitted by the image light generation section. The right LCD 241 varies the transmission of the light transmitted through the right LCD 241 by driving the liquid crystal corresponding to each of the pixel positions arranged in a matrix to thereby modulate the illumination light IL, which is emitted from the right backlight 221, into valid image light PL representing the image. The same applies to the left side. It should be noted that although in the present embodiment, the backlight system is adopted as shown in FIG. 3, it is also possible to adopt a configuration of emitting the image light using a front light system or a reflective system.

A-2. Device Check Process

Figure 4:
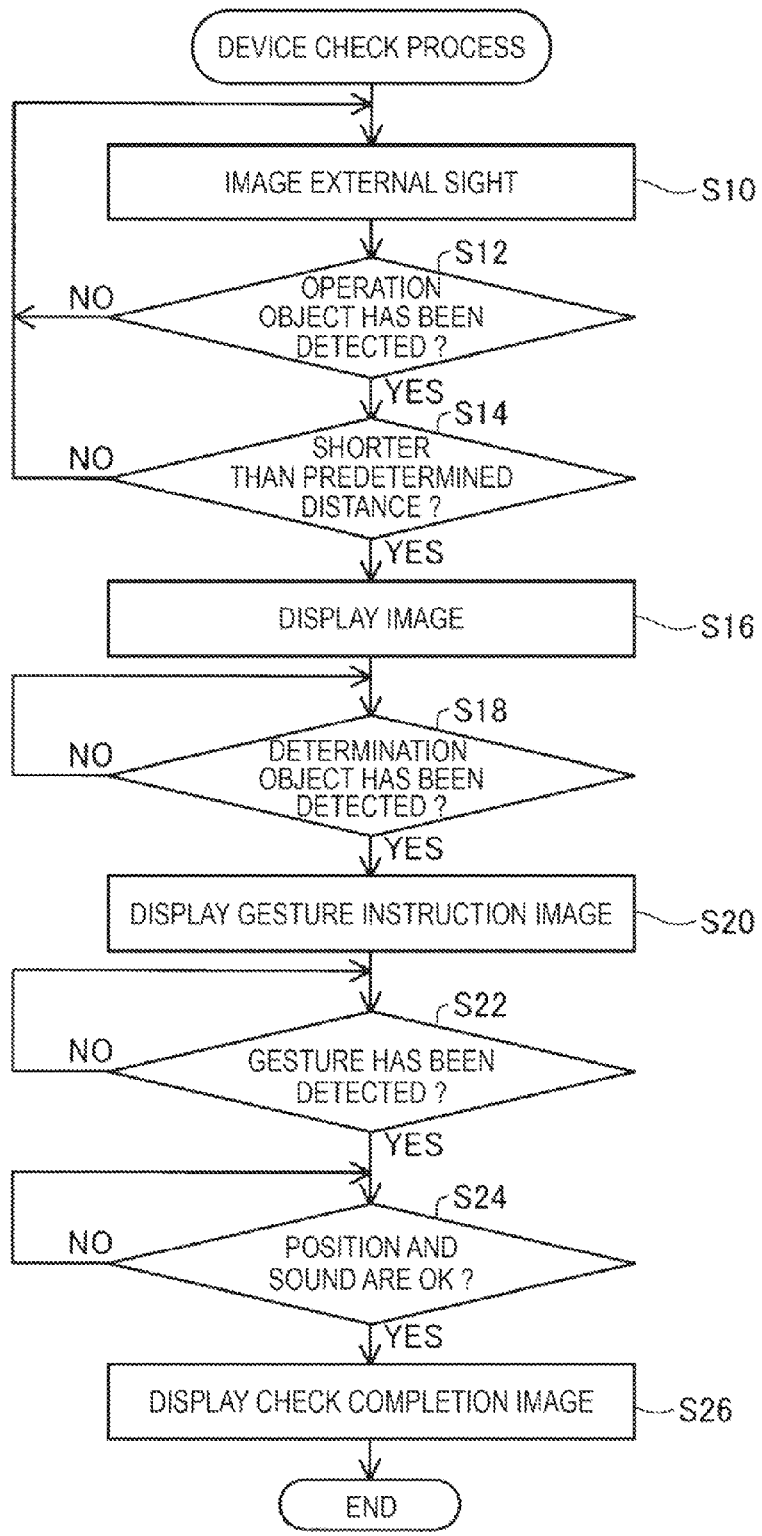
FIG. 4 is an explanatory diagram showing the flow of a device check process.

FIG. 4 is an explanatory diagram showing the flow of the device check process. In the device check process, when the control section 10 detects a predetermined motion (hereinafter also referred to simply as a "gesture") of the determination object (e.g., the finger of the user) after setting the selectable operation object (e.g., a meter of a control device), the control section 10 performs device check as the control instruction base on the gesture.

Firstly, the camera 61 takes (step S10) an image of the external sight SC. It should be noted that the camera 61 continuously takes the image of the external sight SC. In other words, the camera 61 takes the image of the external sight SC as a moving image. The camera 61 transmits the image data of the taken image thus taken to the image determination section 168 of the CPU 140. Then, the image determination section 168 performs the image recognition process such as pattern matching on the taken image taken by the camera 61 to thereby detect (step S12) whether or not the image the same as the image data of the operation object stored in the storage section 120 is included in the taken image. In the case in which the image of the image data the same as the operation object has not been detected in the taken image (NO in the step S12), the camera 61 repeats the process of the step S10 until the image of the image data the same as the operation object is detected in the taken image. In the case in which the image of the image data the same as the operation object has been detected in the taken image in the process of the step S12 (YES in the step S12), the distance measurement section 166 of the CPU 140 measures the distance between an object (hereinafter also referred to simply as a "tentative object") of the image representing the operation object and the image display section 20 with the TOF method using the TOF sensor 63 and the infrared LED 64 at the same time when the image determination section 168 detects the tentative object in the taken image. The distance measurement section 166 determines (step S14) whether or not the distance measured between the tentative object detected by the image determination section 168 and the image display section 20 is equal to or shorter than a predetermined distance. In the case in which it is determined that the distance measured between the tentative object and the image display section 20 exceeds the predetermined distance (NO in the step S14), the image determination section 168 does not set the tentative object as the selectable operation object, but the camera 61 repeats the process in the step S10 and the subsequent steps. In the case in which it is determined in the process of the step S14 that the distance between the tentative object and the image display section 20 is equal to or shorter than the predetermined distance (YES in the step S14), the image setting section 165 sets the tentative object detected by the image determination section 168 as the selectable operation object, and then makes the image display section 20 display (step S16) the image having been associated with the operation object and stored in the storage section 120.

Figure 5:
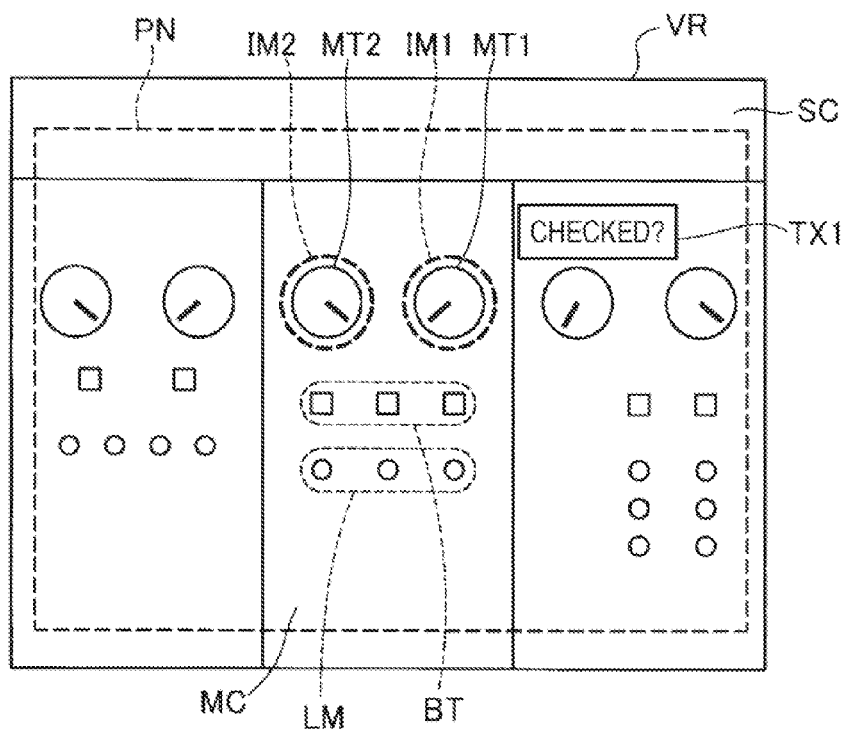
FIG. 5 is an explanatory diagram showing an example of a visual field to be visually recognized by the user in the case in which an operation object has been detected.

FIG. 5 is an explanatory diagram showing an example of a visual field VR to be visually recognized by the user in the case in which operation objects have been set. As shown in FIG. 5, as the operation objects thus set, the user visually recognizes three control devices MC, which are devices different from the HMD 100, as the see-through external sight SC. Among the three control devices MC visually recognized by the user, the central one has a meter MT1 for indicating the voltage value of another device controlled by the control device MC, a meter MT2 for indicating the temperature of the another device, a button group BT as a plurality of buttons, and a lamp group LM including a plurality of lamps. Each of the buttons included in the button group BT is held down to be switched between an ON state and an OFF state to thereby control the another device. Each of the lamps of the lamp group LM is put ON in the case in which the button included in the button group BT and disposed on the upper side so as to correspond to the lamp is in the ON state, and is put OFF in the case in which the button is in the OFF state. It should be noted that the meter MT1 and the meter MT2 each correspond to a selectable object in the appended claims.

In the present embodiment, since the storage section 120 stores the image data of the meter MT1 and the meter MT2, the image determination section 168 detects the meter MT1 and the meter MT2 as the operation objects. When the image determination section 168 sets the meter MT1 and the meter MT2 as the operation objects, the image setting section 165 makes an image IM1 and an image IM2 showing the respective positions of the meter MT1 and the meter MT2 be displayed on the maximum image display area PN of the image display section 20 as the images stored in the storage section 120. It should be noted that the maximum image display area PN represents the maximum possible area for the image light generation section to display an image, and is not visually recognized by the user. Further, the image setting section 165 makes a text image TX1 of "CHECKED?" be displayed in the maximum image display area PN as the image, which is stored in the storage section 120, and is associated with at least one of the meter MT1 and the meter MT2 as the operation objects thus set. The text image TX1 is an image for prompting the user to perform a check action of the numerical value indicated by the meter MT1 or the meter MT2.

When the meter MT1 and so on as the operation objects are set by the image determination section 168, and the image such as the text image TX1 is displayed by the image setting section 165 in the maximum image display area PN (step S16 shown in FIG. 4), the image determination section 168 detects (step S18) whether or not the image the same as the image data of the determination object, which is used for determining the gesture and is stored in the storage section 120, is included in the taken image. In the case in which the image of the determination object has not been detected in the taken image (NO in the step S18), the image determination section 168 waits (step S18) for detection of the determination object. In the case in which the image of the determination object has been detected in the taken image (YES in the step S18), the image setting section 165 of the CPU 140 makes the gesture instruction image, which is stored in the storage section 120 and is used for instructing the gesture for the user to perform in order to perform the check action prompted by the text image TX1, be displayed (step S20) in the maximum image display area PN.

Figure 6:
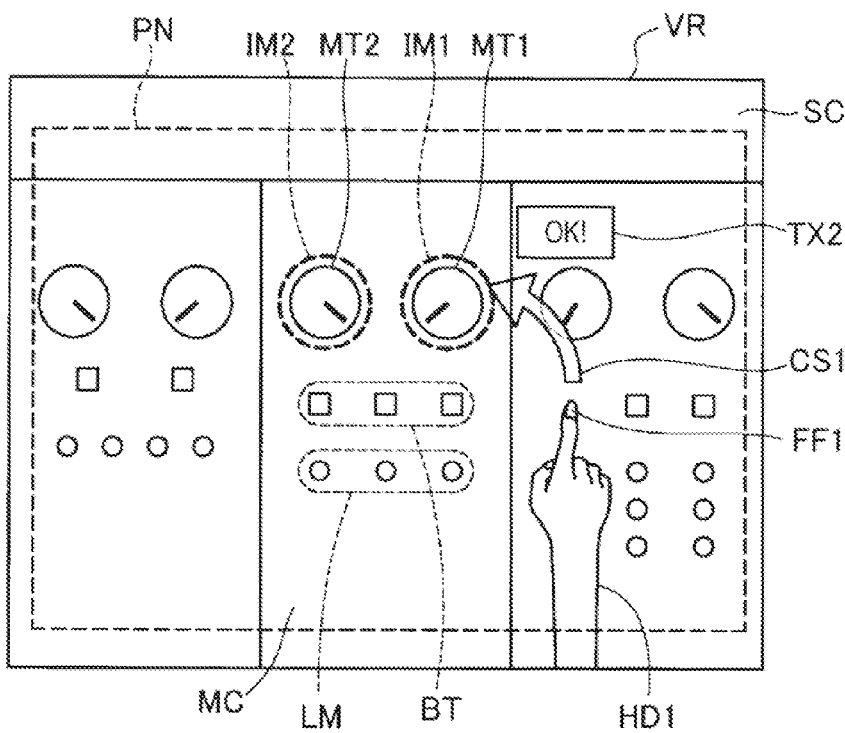
FIG. 6 is an explanatory diagram showing an example of a visual field to be visually recognized by the user in the case in which a determination object has been detected.

FIG. 6 is an explanatory diagram showing an example of a visual field VR to be visually recognized by the user in the case in which a determination object has been detected. FIG. 6 shows the state in which the first finger FF1 of the right hand HD1 of the user having been detected as the determination object is held up. As shown in FIG. 6, in the case in which the right hand HD1 as the determination object has been detected, the image setting section 165 makes the gesture instruction image, which shows the gesture to be performed for confirming that the indications of the meters MT1, MT2 stored in the storage section 120 are respectively lower than predetermined threshold values, be displayed in the maximum image display area PN. It should be noted that the first finger FF1 of the right hand HD1 corresponds to a specific object in the appended claims. The gesture instruction image corresponds to an object-correspondence virtual image in the appended claims.

The gesture instruction image is formed of an arrow image CS1 having a parabolic shape extending from the tip of the first finger FF1 of the right hand HD1 to the meter MT1, and a text image TX2 representing "OK!" which is a determination sound produced by the user. In the present embodiment, when the determination sound of "OK!" has been detected by the microphone 69 and the sound processing section 170 after the first finger FF1 has moved to a position overlapping the meter MT1 in the taken image, the image setting section 165 performs the control instruction of the check action. It should be noted that in the device check process stored in the storage section 120, it is arranged that in the case in which both of the meters MT1, MT2 have been detected, the device check of the meter MT1 takes precedence. It is possible for the user to visually recognize the external sight SC overlapping the text images TX1, TX2 and the arrow image CS1 in a see-through manner. The control instruction of the check action corresponds to control of an object determined in the appended claims.

When the image setting section 165 displays (step S20 shown in FIG. 4) the gesture instruction image in the maximum image display area PN, the image determination section 168 waits (step S22) for detection of the gesture of the first finger FF1 along the arrow image CS1. The image determination section 168 detects the gesture of the first finger FF1 by performing the image recognition process such as pattern matching on the image of the first finger FF1 in each of the frames of the taken images continuously taken by the camera 61. In the case in which the gesture of the first finger FF1 along the arrow image CS1 has not been detected (NO in the step S22), the image determination section 168 continuously waits (step S22) for detection of the gesture of the first finger FF1 along the arrow image CS1. In the case in which the gesture of the first finger FF1 along the arrow image CS1 has been detected (YES in the step S22), the image setting section 165 waits (step S24) for the determination sound of "OK!" represented by the text image TX2 to be detected by the sound processing section 170 via the microphone 69 in the state in which the position of the first finger FF1 after performing the gesture overlaps the meter MT1 in the taken image. In the case in which no determination sound has been detected, or the case in which the position of the first finger FF1 does not overlap the meter MT1 (NO in the step S24), the image setting section 165 continuously waits (step S24) for detection of the determination sound in the state in which the position of the first finger FF1 and the meter MT1 overlap each other in the taken image. In the case in which the determination sound of "OK!" has been detected in the state in which the position of the first finger FF1 and the meter MT1 overlap each other in the taken image (YES in the step S24), the image setting section 165 determines that the gesture for performing the check action has been performed, makes a check completion image to be displayed after completing the check action be displayed (step S26) in the maximum image display area PN, and then terminates the device check process. It should be noted that the check completion image corresponds to a specific check image in the appended claims.

Figure 7:
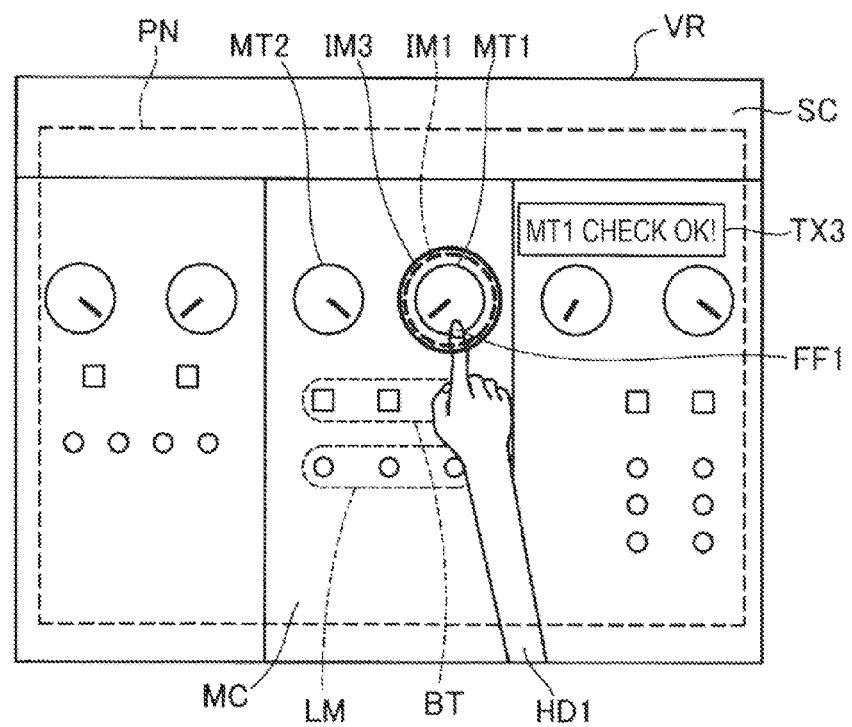
FIG. 7 is an explanatory diagram showing an example of a visual field to be visually recognized by the user in the case in which a check completion image has been displayed.

FIG. 7 is an explanatory diagram showing an example of a visual field VR to be visually recognized by the user in the case in which the check completion image has been displayed. FIG. 7 shows the visual field VR visually recognized by the user when the check action by the user has been detected, and then a text image TX3 of "MT1 CHECK OK!" as the check completion image has been displayed. In the case in which the position of the first finger FF1 and the meter MT1 overlap each other in the taken image, the image setting section 165 makes an image IM3 of a solid circle surrounding the meter MT1 be displayed in the maximum image display area PN in order to represent that the indication of the meter MT1 has been checked in addition to the image IM1 representing the position of the meter MT1. It is possible for the user to visually recognize the text image TX3 and the image IM3 displayed in the maximum image display area PN to thereby confirm that the gesture has normally been processed, and the control instruction of the device check has been performed.

As explained hereinabove, in the HMD 100 according to the present embodiment, the image determination section 168 detects the operation object and the determination object included in the taken image, and the image setting section 165 makes the images IM1, IM2 associated with the operation object thus detected and the text image TX1 be displayed in the maximum image display area PN, then determines the control instruction of the device check corresponding to the gesture of the determination object thus detected, and then performs the control instruction. Therefore, in the HMD 100 according to the present embodiment, it is possible for the user to visually recognize the operation object as an object of the operation and the control associated with the gesture to be performed by the user at the same time without changing the eye direction, and to intuitively perform the control of the operation object, and thus the convenience of the user is improved.

Further, in the HMD 100 according to the present embodiment, when the right hand HD1 as the determination object is detected, the image setting section 165 makes the arrow image CS1 representing the change in the first finger FF1 be displayed in the maximum image display area PN as an image associated with the combination of the meters MT1, MT2 and the first finger FF1 of the right hand HD1. Therefore, in the HMD 100 according to the present embodiment, it is possible for the user to recognize the gesture necessary to perform the control instruction as visual information, and thus, the usability of the HMD 100 for the user is improved.

Further, in the HMD 100 according to the present embodiment, in the case in which the sound processing section 170 has detected the determination sound in the state in which the position of the first finger FF1 as the determination object and the meter MT1 as the operation object overlap each other, the image setting section 165 makes the text image TX3 as the check completion image be displayed in the maximum image display area PN. Therefore, in the HMD 100 according to the present embodiment, since there is performed the control instruction corresponding to the operation object overlapped by the determination object after the gesture has been performed, it is easy for the user to perform the gesture corresponding to the control instruction intended. Further, since the control instruction is performed in accordance with the combination of the gesture and the sound, it is possible for the user to intuitively perform a larger number of control instructions compared to the control instructions performed in accordance with the gesture alone.

Further, in the HMD 100 according to the present embodiment, in the case in which the distance between the image display section 20 and the tentative object measured by the distance measurement section 166 is equal to or shorter than a predetermined distance, the image setting section 165 sets the tentative object thus detected as the selectable operation object. Therefore, in the HMD 100 according to the present embodiment, in the case in which a plurality of tentative objects has been detected in the taken image, those located near to the user are set as the selectable operation objects. Therefore, since the user is made to visually recognize these having a high possibility of being selected by the user, the convenience of the user is enhanced.

B. Second Embodiment

In the second embodiment, unlike the first embodiment, in the control system 500 provided with an HMD 100a and the control device 300, transmission and reception of the signal of the control instruction is performed between the HMD 100a and the control device 300. Thus, after the HMD 100a has received the information for identifying the operation object transmitted from the control device 300, the control of the control device 300 is performed based on the control instruction thus input in the HMD 100a.

Figure 8:
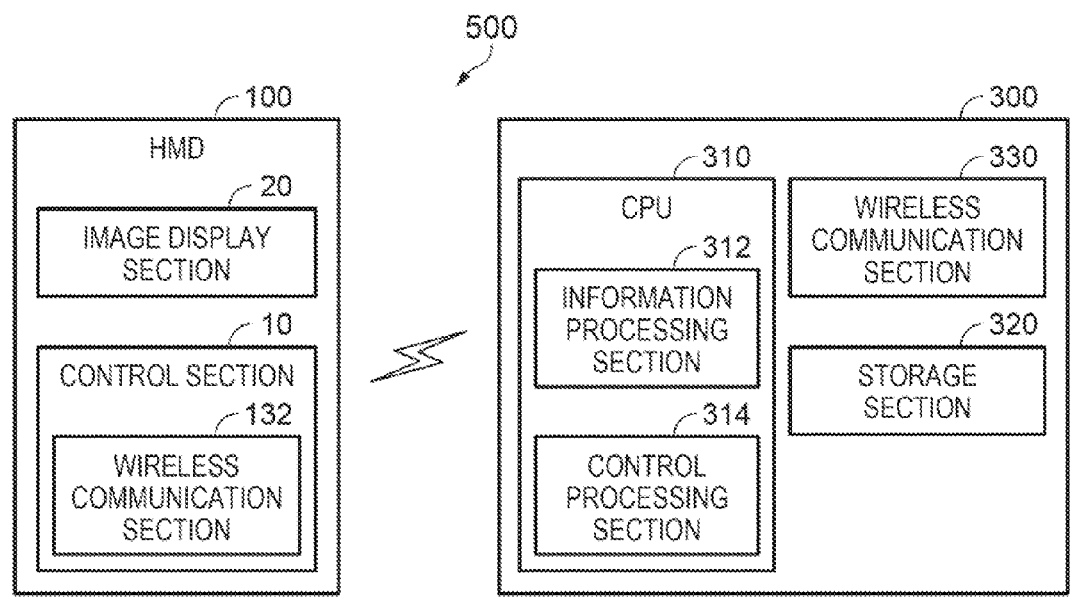
FIG. 8 is a block diagram functionally showing a configuration of a control system according to a second embodiment of the invention.

FIG. 8 is a block diagram functionally showing a configuration of a control system 500 according to the second embodiment. The control system 500 is provided with the HMD 100a and a control device 300. It should be noted that although FIG. 8 only shows one HMD 100a and one control device 300, the control system 500 can also be provided with a plurality of HMDs 100a and a plurality of control devices 300, or it is also possible to perform transmission and reception of information via a device (e.g., a server) different from the HMD 100a or the control device 300. The HMD 100a in the second embodiment is provided with a wireless communication section 132 included in the control section 10 in addition to the configuration of the HMD 100 according to the first embodiment. In FIG. 8, since the HMD 100a is the same in configuration except the wireless communication section 132 as the HMD 100 according to the first embodiment (FIG. 2), the configuration of the HMD 100a is partially omitted from the graphical description.

The wireless communication section 132 of the HMD 100a performs wireless communication with other devices under a predetermined wireless communication method such as wireless LAN or Bluetooth (registered trademark). The wireless communication section 132 transmits the information of the control instruction, which has been determined by the gesture of the user, to the control device 300. Further, the wireless communication section 132 receives the information for identifying the operation object, the determination object, the determination sound, the gesture, and so on from the control device 300. It should be noted that the wireless communication section 132 in the second embodiment corresponds to a second communication section in the appended claims.

The control device 300 is provided with a wireless communication section 330, a storage section 320, and a CPU 310. The wireless communication section 330 performs wireless communication with the HMD 100a under the predetermined wireless communication method such as the wireless LAN or the Bluetooth. It should be noted that the wireless communication section 330 in the second embodiment corresponds to a first communication section in the appended claims. The storage section 320 is constituted by, for example, a ROM, a RAM, a DRAM, or a hard disk. The storage section 320 stores the control content associated with the control instruction for controlling the control device 300. Further, the storage section 320 stores the image data of the operation object detected in the case of being included in the taken image taken by the camera 61, and the image data of the determination object to be the basis of the determination of performing the control. It should be noted that the storage section 320 in the second embodiment corresponds to an object identification section in the appended claims.

The CPU 310 retrieves and then executes a computer program stored in the storage section 320 to thereby function as an information processing section 312 and a control processing section 314. The information processing section 312 processes the information of identifying the control instruction and the operation object transmitted and received between the information processing section 312 and the wireless communication section 132 of the HMD 100a via the wireless communication section 330. The control processing section 314 controls the control device 300 so as to correspond to the control instruction, which has been processed by the information processing section 312, based on the information of the control instruction. It should be noted that the control device 300 in the second embodiment corresponds to a control execution section in the appended claims.

Figure 9:
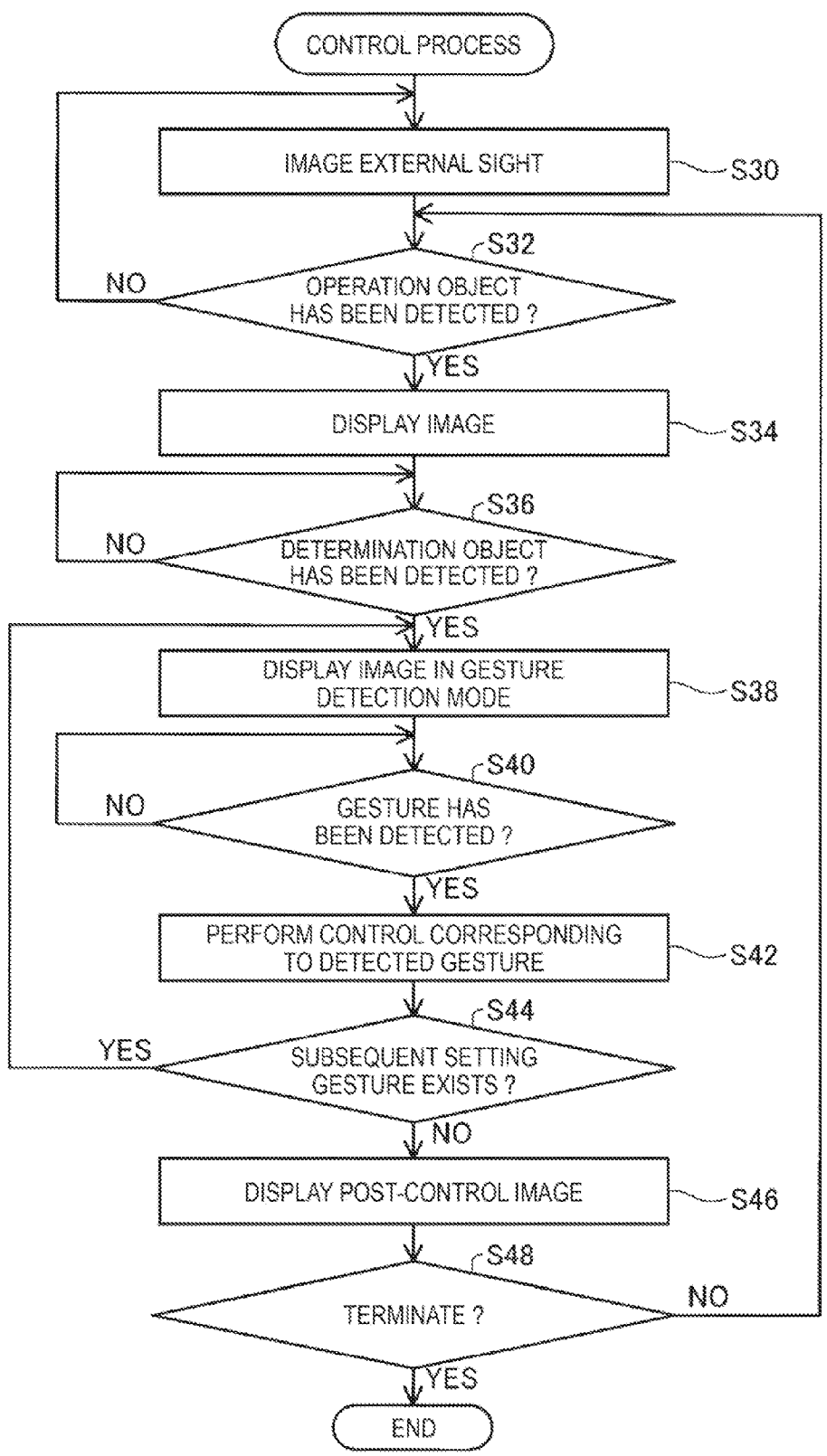
FIG. 9 is an explanatory diagram showing the flow of a control process.

FIG. 9 is an explanatory diagram showing the flow of a control process. The process corresponding to the steps from S30 to S36 in the control process is the same as the process corresponding to the steps from S10 to S18 except the process of identifying the distance between the image display section 20 and the operation object in the device check process (FIG. 4) according to the first embodiment. Therefore, in the description of the second embodiment, the process corresponding to the steps from S30 to S36 in the control process will briefly be explained.

In the control process, when the external sight SC is imaged (step S30) by the camera 61, and the operation object has been detected in the taken image (YES in the step S32), the image setting section 165 makes the image associated with the operation object be displayed in the maximum image display area PN.

Figure 10:
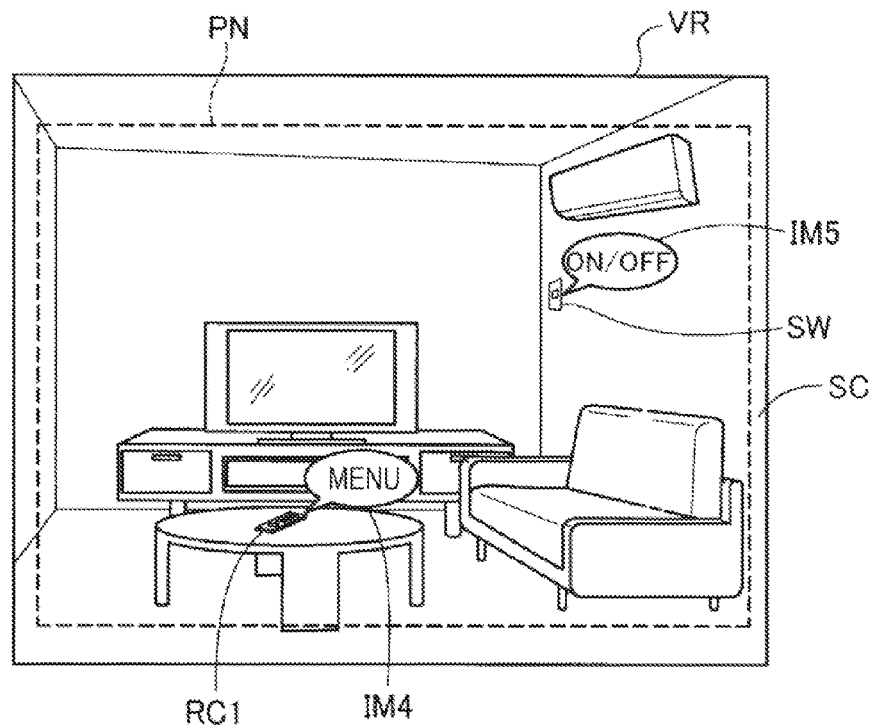
FIG. 10 is an explanatory diagram showing an example of a visual field to be visually recognized by the user in the case in which operation objects have been detected.

FIG. 10 is an explanatory diagram showing an example of a visual field VR to be visually recognized by the user in the case in which operation objects have been detected. FIG. 10 shows the external sight SC to be visually recognized by the user in a living room, and images IM4, IM5 displayed in the maximum image display area PN. As shown in FIG. 10, the user visually recognizes a remote controller RC1 of a television set and a switch SW as a switch of a room illumination, which are the operation objects set by the image determination section 168, and the image IM4 associated with the remote controller RC1 and the image IM5 associated with the switch SW both stored in the storage section 320. It should be noted that the remote controller RC1 and the switch SW each correspond to an object in the appended claims.

In the state in which the images IM4, IM5 are displayed (step S34 shown in FIG. 9), in the case in which the determination object has been detected by the image determination section 168 (YES in the step S36), the image setting section 165 makes the image of a gesture detection mode representing the state, in which the gesture of the user can be detected, be displayed (step S38) in the maximum image display area PN.

Figure 11:
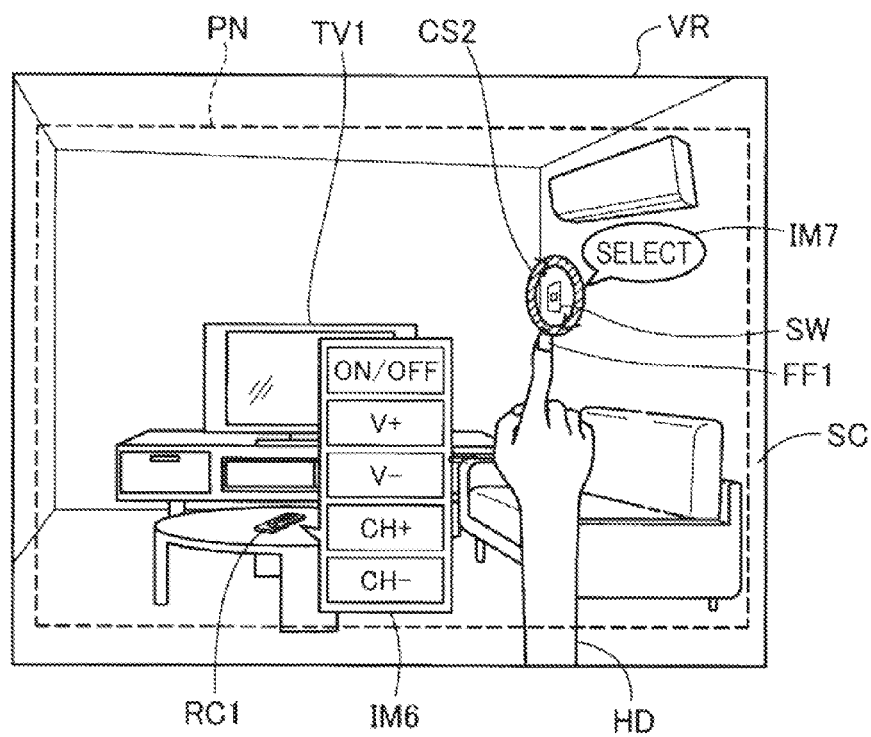
FIG. 11 is an explanatory diagram showing an example of a visual field to be visually recognized by the user in the case of a gesture detection mode.

FIG. 11 is an explanatory diagram showing an example of a visual field VR to be visually recognized by the user in the case of the gesture detection mode. As shown in FIG. 11, the image determination section 168 detects the right hand HD1 as the determination object, and the image setting section 165 displays an IM6 associated with the remote controller RC1 and then displays an arrow image CS2 and an image IM7 both associated with the switch SW. The image IM6 is an image including a plurality of icons representing contents to be controlled if the position of the first finger FF1 of the right hand HD1 overlaps the icons. For example, when the "ON/OFF" icon among the icons displayed is selected in accordance with a change in the position of the finger FF1, the control processing section 314 performs the control of switching between the ON state and the OFF state of the power of the television set TV1. Further, the arrow image CS2 shown in FIG. 11 is an image representing the gesture, which should be performed by the user in order to perform the control of selecting the switch SW. An image IM7 is an image representing the control content to be performed when the gesture of the first finger FF1 along the arrow image CS2 has been performed. Specifically, the image IM7 represents that the switch SW is selected when the first finger FF1 of the user moves along the arrow image CS2 so as to surround the switch SW.

When the image setting section 165 displays (step S38 shown in FIG. 9) the image of the gesture detection mode in the maximum image display area PN, the image determination section 168 waits (step S40) for detection of the gesture of the right hand HD1 for performing the control of the remote controller RC1 or the switch SW. In the case in which the gesture of the right hand HD1 has not been detected (NO in the step S40), the image determination section 168 continuously waits (step S40) for detection of the gesture of the right hand HD1. In the case in which the gesture of the right hand HD1 has been detected (YES in the step S40), the image setting section 165 performs (step S42) the control corresponding to the detected gesture, which is a gesture having been detected. The image setting section 165 determines (step S44) whether or not there exists a setting gesture, which is a gesture corresponding to execution of another control set subsequently to the control having been performed corresponding to the detected gesture. In the case in which it has been determined that the setting gesture exists (YES in the step S44), the image setting section 165 makes the image of the gesture detection mode corresponding to the setting gesture be displayed (step S38) in the maximum image display area PN.

Figure 12:
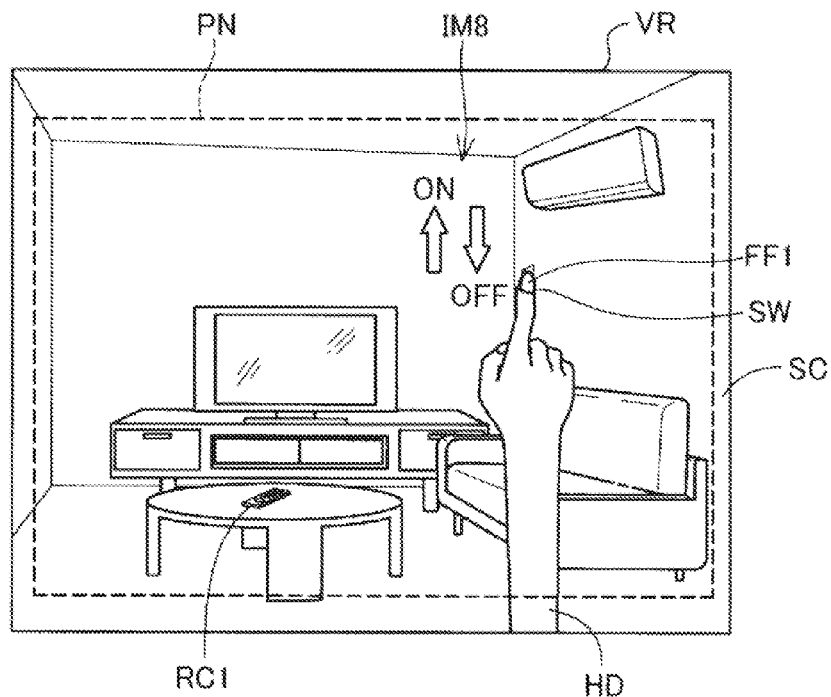
FIG. 12 is an explanatory diagram showing an example of a visual field to be visually recognized by the user in the case in which an image of the gesture detection mode corresponding to a setting gesture has been displayed.

FIG. 12 is an explanatory diagram showing an example of a visual field VR to be visually recognized by the user in the case in which the image of the gesture detection mode corresponding to the setting gesture has been displayed. FIG. 12 shows an image IM8, which is a gesture instruction image corresponding to the setting gesture to be performed after the motion of the first finger FF1 along the arrow image CS2 (FIG. 11) has been detected as the detected gesture. The image IM8 is an image representing the control of setting the switch SW to the ON state in the case in which the first finger FF1 is moved in the upward direction, and setting the switch SW to the OFF state in the case in which the first finger FF1 is moved in the downward direction.

When the image setting section 165 displays (step S38 shown in FIG. 9) the image of the gesture detection mode in the maximum image display area PN, and the gesture of setting the switch SW to the ON state or the OFF state has been detected (YES in the step S40), the image setting section 165 performs (step S42) the control corresponding to the detected gesture. In the case in which there exists the setting gesture corresponding to the control to be performed subsequently to the control having been performed (YES in the step S44), the process corresponding to the step S38 and the subsequent steps. In the case in which the setting gesture corresponding to the control to be performed subsequently to the control having been performed does not exist in the process of the step S44 (NO in the step S44), the image setting section 165 makes a post-control image, which represents that the control corresponding to the detected gesture has been performed, be displayed (step S46) in the maximum image display area PN.

Figure 13:
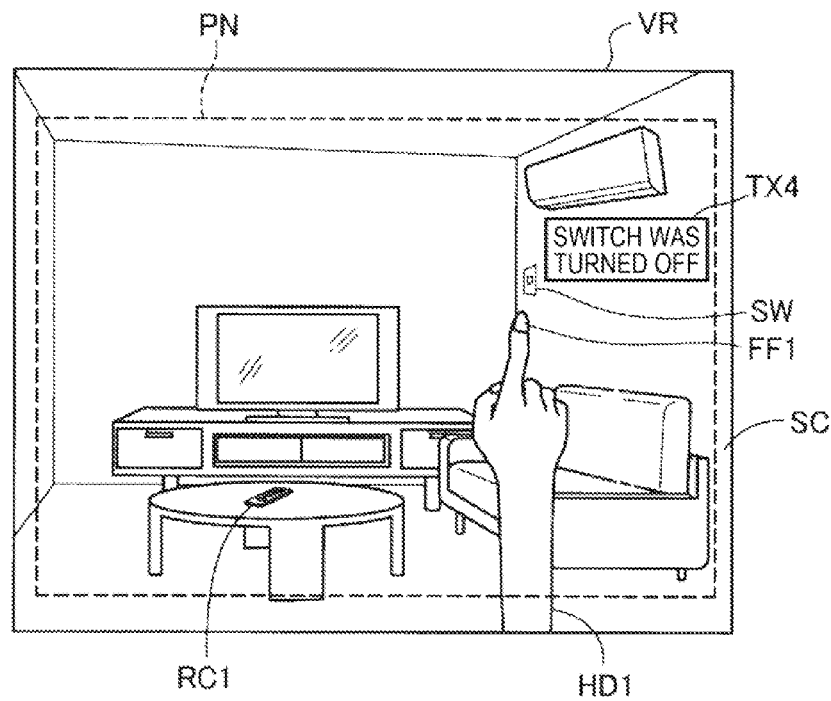
FIG. 13 is an explanatory diagram showing an example of a visual field to be visually recognized by the user in the case in which a post-control image has been displayed.

FIG. 13 is an explanatory diagram showing an example of a visual field VR to be visually recognized by the user in the case in which the post-control image has been displayed. FIG. 13 shows the state in which a text image TX4 as the post-control image is displayed after the setting gesture of setting the switch SW as the detected gesture to the OFF state has been detected. As shown in FIG. 13, when the switch SW is set to the OFF state by the control processing section 314, the text image TX4 of "SWITCH WAS TURNED OFF" for informing the user of the fact that the switch SW is set to the OFF state by the control processing section 314 is displayed by the image setting section 165 in the maximum image display area PN.

When the text image TX4 of the post-control image is displayed (step S46 shown in FIG. 9) in the maximum image display area PN, the image setting section 165 displays the text image TX4 in the maximum image display area PN for a predetermined period of time. While the text image TX4 is displayed in the maximum image display area PN, the operation section 135 waits (step S48) for detection of a predetermined operation for terminating the control process using the operation object and so on having been detected in the taken image. In the case in which the operation section 135 has failed to detect the predetermined operation for terminating the control process while the text image TX4 is displayed in the maximum image display area PN (NO in the step S48), the image setting section 165 sets the text image TX4 to a nondisplay state, and then the process corresponding to the step S32 and the subsequent steps. In the case in which the operation section 135 detects the predetermined process of terminating the control process in the process of the step S48 (YES in the step S48), the control section 10 terminates the control process. It should be noted that in the second embodiment, by the operation section 135 detecting the predetermined operation, the control section 10 can terminate the control process even in the mid-flow of the control process.

As explained hereinabove, in the HMD 100a according to the second embodiment, the image setting section 165 makes the image IM8 representing the control of the switch SW to the ON state and the OFF state, which is performed in accordance with the direction of the motion of the first finger FF1 of the right hand HD1 along the vertical direction, be displayed in the maximum image display area PN as shown in FIG. 12. Therefore, in the HMD 100a according to the second embodiment, since it is possible for the user to recognize the content of the control to be subsequently performed in accordance with the gesture of the user as visual information, the usability for the user is improved.

C. Third Embodiment

The third embodiment is mainly different from the first and second embodiments in that the position information of the operation object is obtained as optical information or via wireless communication, and that the change in the position of the determination object is identified by detecting the acceleration of the determination object.

Figure 14:
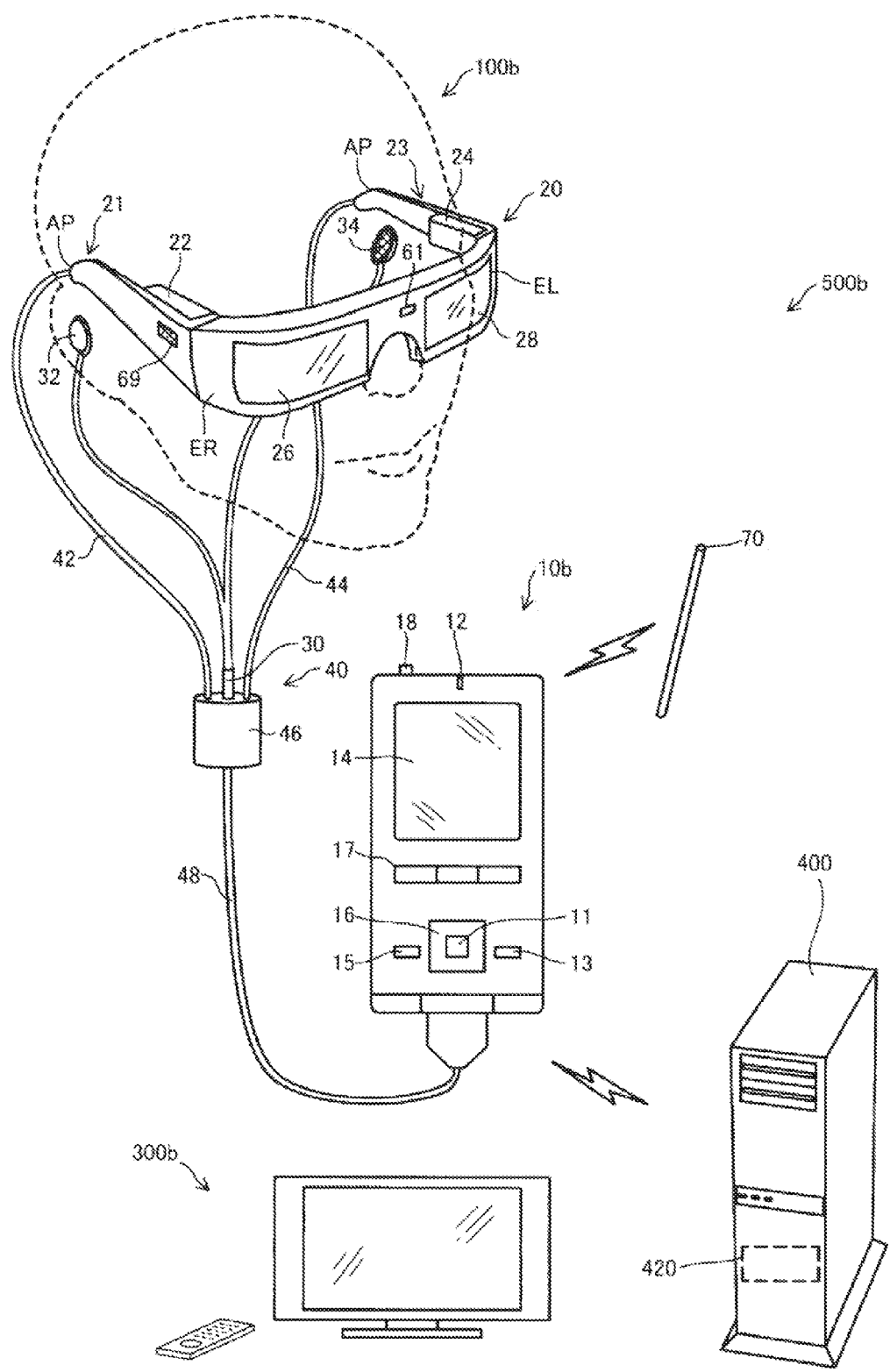
FIG. 14 is a schematic diagram showing a configuration of a control system according to a third embodiment of the invention.

FIG. 14 is a schematic diagram showing a configuration of a control system 500b according to the third embodiment. The control system 500b is provided with an HMD 100b, a server 400, and a control device 300b. The HMD 100b is provided with an image display section 20b, a control section 10b, and an external sensor 70 as the determination object. The external sensor 70 incorporates an acceleration sensor for detecting the motion of the external sensor 70. The external sensor 70 transmits the acceleration thus detected to the control section 10b using a communication device such as Bluetooth. The control section 10b calculates the change in the position of the external sensor 70 based on the acceleration of the external sensor 70 thus transmitted. The control section 10b controls the control device 300b based on the change in the position of the external sensor 70 thus calculated. The image display section 20b does not include the TOF sensor 63 and the infrared LED 64 in the first and second embodiments. It should be noted that although in the present embodiment, as shown in FIG. 1, the explanation is presented assuming the control device 300b as a television set, an illumination device or the like other than the television set can also be adopted as the control device 300b in other embodiments.

The server 400 includes storage section 420 for storing the information of the control device 300b such as a control apparatus on which a control instruction is performed by the gesture detected, and the operation object for providing the control instruction to the control apparatus. It should be noted that the gesture in the third embodiment includes the change in the position of the external sensor 70. The server 400 transmits at least a part of the information stored in the storage section 420 to the HMD 100b so as to correspond to a signal transmitted from the HMD 100b. The wireless communication section 132b of the control section 10b of the HMD 100b receives the information having been transmitted from the server 400.

FIG. 15 is a schematic diagram showing a part of the information of the control device stored in the storage section 420 of the server 400. The storage section 420 stores the information of a plurality of control devices 300b. For example, as shown in FIG. 15, the television set as one of the control devices 300b is associated with a three-dimensional model and a position coordinate with respect to each of a control apparatus for displaying programs to be put on television and a controller for operating the control apparatus. Further, the television set of the control device 300b is associated with the display information. The three-dimensional model shown in FIG. 15 is three-dimensional image data stored with respect to each of the control apparatus and the controller. The position coordinate represents the place at which each of the control apparatus and the controller is located in the case of taking the HMD 100b as a reference when the HMD 100b receives the information from the server 400. The display image is an example of the content of the image to be displayed on the image display section 20b in the case in which the controller has been detected.

In the third embodiment, the storage section 320b of the control device 300b stores each of procedures in sequence control to be performed using a plurality of procedures. For example, in the case in which the control device 300b is the television set, and a program to be put on television with later time designated is recorded (also described simply as "timer recording is performed"), if a plurality of procedures such as time and date, and the channel of the program to be put on television is correctly input, the recording reservation is completed.

Figure 16:
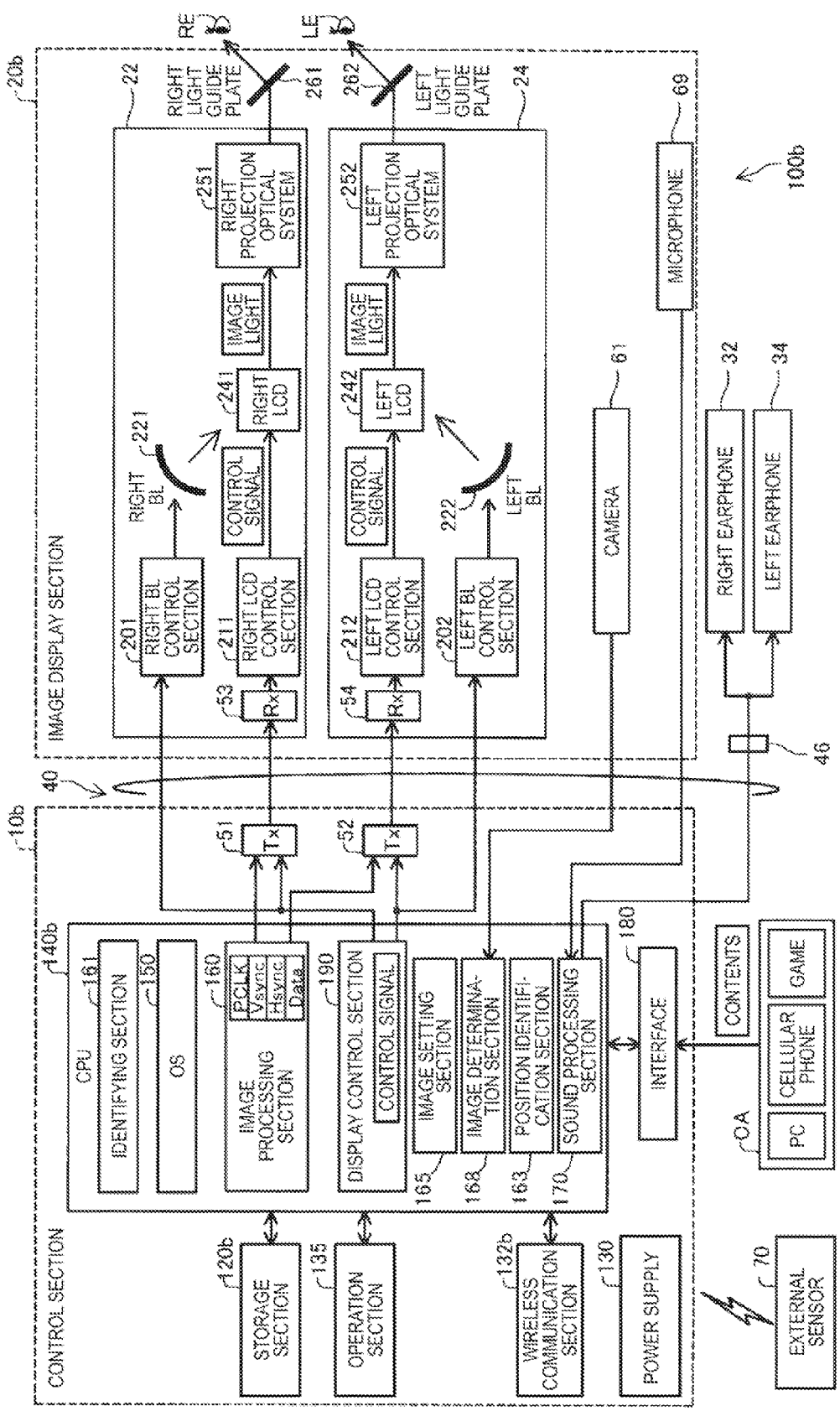
FIG. 16 is a block diagram functionally showing a configuration of an HMD according to a third embodiment.

FIG. 16 is a block diagram functionally showing a configuration of the HMD 100b according to the third embodiment. A storage section 120b of the third embodiment stores personal information for identifying the user of the HMD 100b unlike the storage section 120 of the first and second embodiments. As shown in FIG. 16, a CPU 140b of the control section 10b of the third embodiment does not include the distance measurement section 166 in the first and second embodiments, and includes a position identification section 163 and an identifying section 161. When powering on the HMD 100b, the identifying section 161 makes an image for identifying the user of the HMD 100b be displayed in the maximum image display area PN. Subsequently, the identifying section 161 identifies the user of the HMD 100b based on the operation received by the operation section 135. As the identification method of the user, for example, the following steps are performed in some cases. Firstly, the identifying section 161 makes an image, which is used for making a previous user of the HMD 100b registered in advance be selected, be displayed in the maximum image display area PN. Subsequently, the identifying section 161 makes an image for requiring input of a password having been stored in the storage section 320b be displayed in the maximum image display area PN so as to correspond to the user selected by the operation received by the operation section 135, and then identifies the user of the HMD 100b if the password thus required is input.

The position identification section 163 identifies the positional relationship between the image display section 20b, the control apparatus, and the operation object based on the position information of the control apparatus and the position information of the controller as the operation object obtained from the storage section 420 of the server 400 via the wireless communication section 132b. It should be noted that the position of the image display section 20b is identified based on the intensity of a radio wave, a time difference between radio waves transmitted and received be a plurality of base stations or the like, and so on. Further, the position identification section 163 identifies the change in the position of the external sensor 70 based on the acceleration detected by the external sensor 70. It should be noted that the external sensor 70 corresponds to a specific object in the appended claims.

Figure 17:
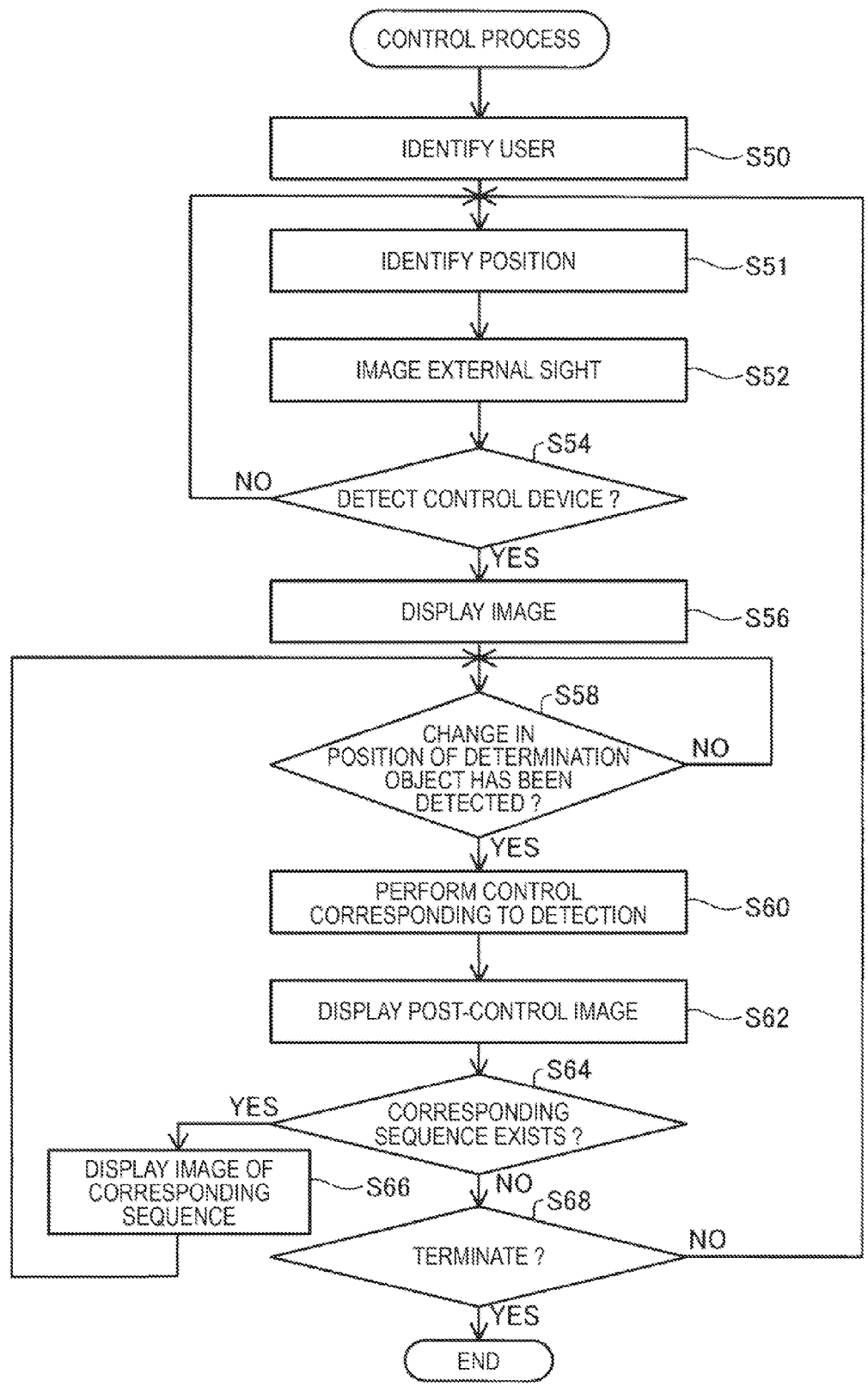
FIG. 17 is an explanatory diagram showing the flow of a control process according to the third embodiment.

FIG. 17 is an explanatory diagram showing the flow of a control process according to the third embodiment. The control process according to the third embodiment is a process in which the control instruction of the control apparatus identified in position based on the change in the external sensor 70 detected.

In the control process according to the third embodiment, firstly, the identifying section 161 identifies (step S50) the user of the HMD 100b. In the third embodiment, the type of the control device 300b to be detected is different by the user thus identified. Specifically, although in one user, a specific control device is detected as an object on which the control instruction can be performed, in another user, the specific control device is determined as an object on which the control instruction cannot be performed, and the specific control device is not detected.

When the user is identified, the position identification section 163 identifies (step S51) the position of the control device located within a predetermined range from the user wearing the image display section 20b from the server 400 via the wireless communication section 132b. Then, the camera 61 takes (step S52) an image of the external sight. Then, the position identification section 163 determines (step S54) whether or not the control device 300b, the position of which has been identified within the predetermined range from the user, has been detected. In the case in which the position identification section 163 fails to detect the control device 300b (NO in the step S54), the position identification section 163 continuously waits (step S51) for the identification of the position of the control device 300b located within the predetermined range from the user. It should be noted that it is sufficient for the control device 300b, which is to be an object of detection on presence or absence in the third embodiment, to be at least either one of the control apparatus and the controller.

In the case in which the control device 300b has been detected in the process of the step S54 (YES in the step S54), the image setting section 165 makes the image representing the position of the control device 300b be displayed (step S56) in the maximum image display area PN. It should be noted that in the third embodiment, the position identification section 163 uses the pattern matching or the like with respect to the imaging range of the place identified as the position of the control device 300b with reference to the three-dimensional model of the control device 300b stored in the storage section 420 of the server 400 to thereby improve the accuracy of the position of the control device 300b with respect to the user. It should be noted that in another embodiment, the position identification section 163 does not need to identify the position of the control device 300b using image recognition.

Figure 18:
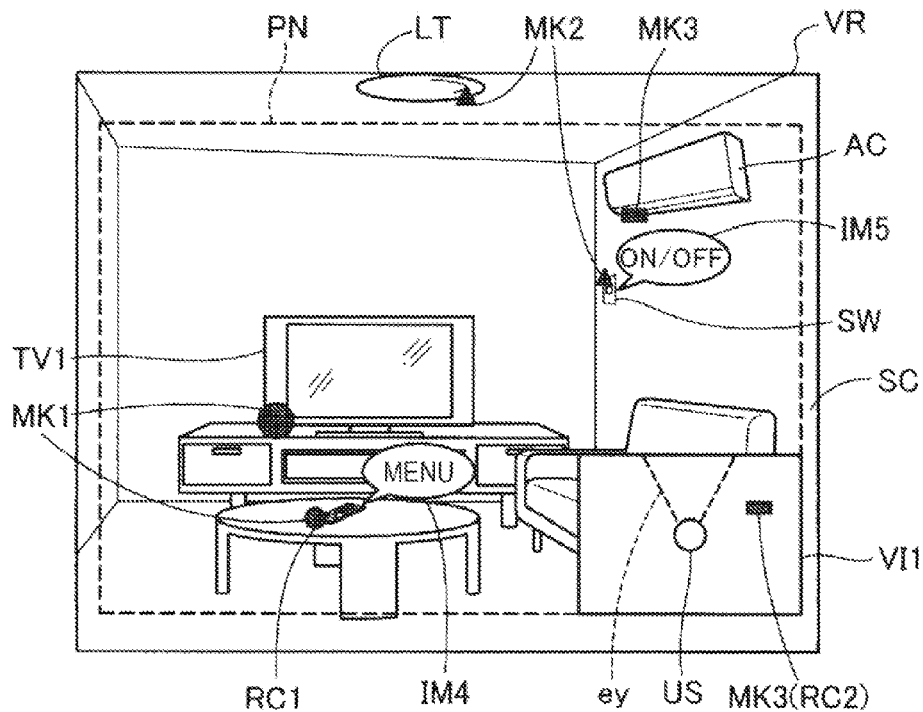
FIG. 18 is an explanatory diagram showing an example of a visual field to be visually recognized by the user in the case in which a control device has been detected.

FIG. 18 is an explanatory diagram showing an example of a visual field VR to be visually recognized by the user in the case in which the control device 300b has been detected. As shown in FIG. 18, corresponding markers MK1, MK2, and MK3 representing three combinations as the control devices 300b thus detected, and a birds-eye view VI are displayed in the maximum image display area PN. In the example shown in FIG. 18, the three control devices 300b thus detected are as follows:

(1) the television set TV1 as the control apparatus, and the remote controller RC1 as the controller;

(2) an illumination LT as the control apparatus, and the switch SW as the controller; and (3) an air conditioner AC as the control apparatus, and a remote controller RC2 as the controller.

The control apparatus and the controller in each of the three control devices are shown so as to be associated with each other using the corresponding markers MK1, MK2, or MK3 as images having the same shape and the same color. For example, the corresponding markers MK1 are displayed in the maximum image display area PN in the vicinity of the television set TV1 as the control apparatus MC and the vicinity of the remote controller RC1 as the controller 10. It should be noted that the corresponding markers having the same shape in the third embodiment are referred to as the corresponding markers having the same shape even if the corresponding markers displayed are different in size from each other.

The birds-eye view VI is a miniature showing an outline of the positional relationship between the user, the imaging range ey of the camera 61, and the remote controller RC2, which is detected and is not included in the imaging range, viewed from the above of the user centered on the user wearing the image display section 20b. In the case in which a part of the control device 300b, the position of which has been identified by the position identification section 163, is not included in the imaging range of the camera 61, the image setting section 165 makes the birds-eye view VI, which shows the positional relationship between the user and the part of the control device 300b not included in the imaging range, be displayed in the maximum image display area PN. As shown in the birds-eye view VI, the remote controller RC2 of the air conditioner AC exists on the right side of the user.

When the image representing the position of the control device 300b is displayed (step S56 shown in FIG. 17) in the maximum image display area PN, the position identification section 163 determines (step S58) the presence or absence of the detection of the change in the position of the external sensor 70 as the determination object. In the case in which the position identification section 163 fails to detect the change in the position of the external sensor 70 (NO in the step S58), the position identification section 163 continuously waits (step S58) for the detection of the change in the position of the external sensor 70 as the determination object.

In the case in which the change in the position of the external sensor 70 as the determination object has been detected in the process of the step S58 (YES in the step S58), the image setting section 165 executes (step S60) the control instruction of the control device 300b corresponding to the change in the position of the external sensor 70 thus detected. As the control instruction corresponding to the change in the position of the external sensor 70, the control instructions different from each other are set to the respective control devices 300b in some cases. For example, in the case of selecting the remote controller RC1 of the television set TV1, when the change in the position where the circular shape of the corresponding marker associated therewith has been detected from the external sensor 70, the image setting section 165 makes a menu image of the television set TV1 corresponding to the image IM4 be displayed in the maximum image display area PN. It should be noted that in another embodiment, in the case in which the external sensor 70 is included in the taken image taken by the camera 61, it is possible for the image setting section 165 to execute the control instruction to the control device 300b based on the acceleration of the external sensor 70 thus detected and the change in the external sensor 70 thus imaged.

When the control instruction corresponding to the change in the position of the external sensor 70 as the operation object thus detected is executed (step S60 shown in FIG. 17), the image setting section 165 makes the image, on which the control has been performed, be displayed (step S62) in the maximum image display area PN. In the third embodiment, since the procedures of the sequence control performed with a plurality of procedures are stored in the storage section 320b of the control device 300b, after the image on which the control has been performed is displayed in the maximum image display area PN, the image setting section 165 determines (step S64) whether or not the corresponding sequence, which has been set as the subsequent procedure to the sequence control, exists in the storage section 320b of the control device 300b via the wireless communication section 132b. In the case in which the image setting section 165 determines that the corresponding sequence exists (YES in the step S64), the image setting section 165 makes the image associated with the corresponding sequence be displayed (step S66) in the maximum image display area PN.

Figure 19:
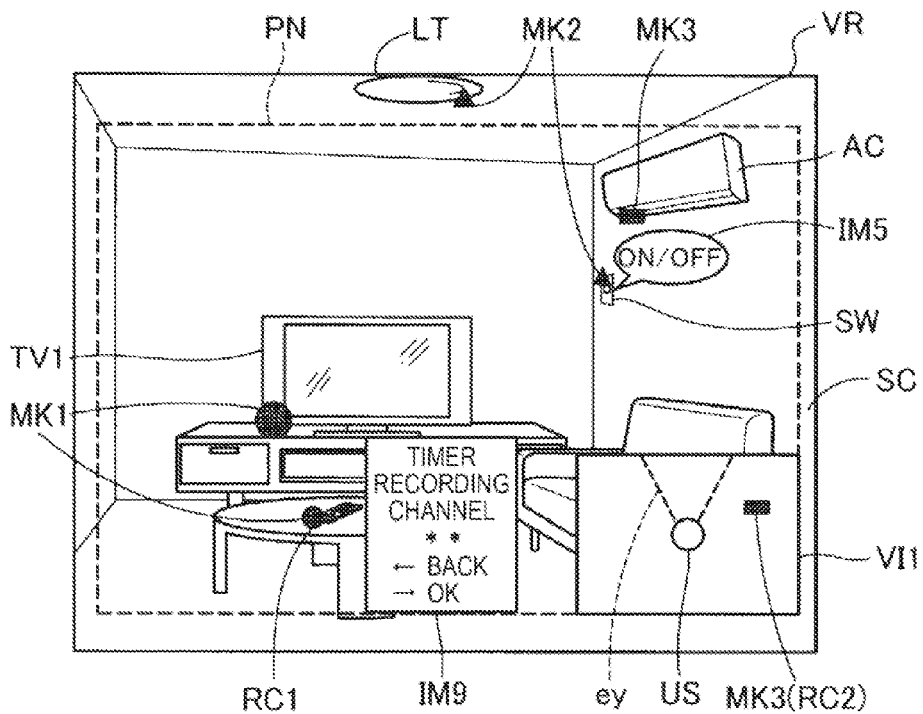
FIG. 19 is an explanatory diagram showing a visual field to be visually recognized by the user in the case in which an image associated with a corresponding sequence has been displayed in the maximum image display area.

FIG. 19 is an explanatory diagram showing a visual field VR to be visually recognized by the user in the case in which an image associated with the corresponding sequence has been displayed in the maximum image display area PN. FIG. 19 shows the state in which the menu of the image IM4 associated with the remote controller RC1 shown in FIG. 18 is selected, and then an image IM9 representing the screen for setting the channel in performing the timer recording is displayed in the maximum image display area PN. When the remote controller RC1 is operated to perform the timer recording, there is performed the sequence control along the following order, setting of the channel to be recorded, time and date when the timer recording is performed, and whether or not periodic weekly timer recording is performed.

If the image IM9 is displayed in the maximum image display area PN, and the external sensor 70 detects an action of drawing a number as the process of the step S58 shown in FIG. 17 (YES in the step S58), the image setting section 165 sets (step S60) the number corresponding to the action thus detected as the channel, and makes the number set in the "**" part of the image IM9 be displayed (step S62). For example, when the user moves the external sensor 70 so as to draw a number of "8" in an empty space, the "8" channel is set as the channel to be recorded. Further, when the external sensor 70 detects the change of being swung leftward along the arrow shown in the image IM9, the image setting section 165 makes the previous image to the setting of the channel to be recorded in the sequence control be displayed in the maximum image display area PN. Further, in the state in which the number of the channel to be recorded is input, when the external sensor 70 detects the change of being swung rightward along the arrow shown in the image IM9, the image setting section 165 sets the channel to be recorded and makes the next image to the setting of the channel to be recorded in the sequence control be displayed in the maximum image display area PN. Subsequently, the process in the step S64 and the subsequent steps is performed in a similar manner.

As explained hereinabove, in the HMD 100b according to the third embodiment, the wireless communication section 132b of the control section 10b receives the position information of the control device 300b stored in the storage section 420 of the server 400. Further, therefore, in the HMD 100b according to the third embodiment, the position of the control device 300b in a range, which the user cannot visually recognize, can be recognized, and thus, the usability for the user is improved.

Further, in the HMD 100b according to the third embodiment, the image setting section 165 makes the birds-eye view VI, which represents the positional relationship between the user wearing the image display section 20b and the remote controller RC2 detected, be displayed in the maximum image display area PN as shown in FIG. 19. Therefore, in the HMD 100b according to the third embodiment, the positional relationship between the position of the control device 300b in a range, which the user cannot visually recognize, and the user can visually be recognized as an image, and thus, the usability for the user is further enhanced.

Further, in the HMD 100b according to the third embodiment, the external sensor 70 detects the acceleration as the change in the position of the external sensor 70. The image setting section 165 executes the control instruction to the control device 300b based on the change in the position of the external sensor 70 thus detected. Therefore, in the HMD 100b according to the third embodiment, in the case in which the user executes the control instruction to the control device 300b, it is not required to operate a specific place or to perform an action associated with the operation in the range to be imaged, and thus, the usability for the user is improved.

Further, in the HMD 100b according to the third embodiment, as shown in FIG. 18, the image setting section 165 makes the position of the control apparatus detected and the position of the controller of the control apparatus detected be displayed in the maximum image display area PN so as to be associated with each other using the corresponding markers as the images having the same shape and the same color. Therefore, in the HMD 100b according to the third embodiment, the correspondence relationship between the control apparatus detected and the controller of the control apparatus detected can be made to be visually recognized, and thus, the usability for the user is improved.

Further, in the HMD 100b according to the third embodiment, the identifying section 161 identifies the user of the HMD 100b, and the image setting section 165 makes the image related to the control device, on which the control instruction of the user thus identified can be executed, be displayed in the maximum image display area PN. Therefore, in the HMD 100b according to the third embodiment, since the image different by the user identified is displayed in the maximum image display area PN, the information meeting the need of the user can be provided.

D. Modified Examples

It should be noted that the invention is not limited to the embodiments described above, but can be implemented in various forms within the scope or the spirit of the invention, and the following modifications, for example, are also possible.

D1. Modified Example 1

Although in the embodiments described above, the image setting section 165 displays the images corresponding to the operation object thus set and the determination object thus detected, and the gesture instruction images in the maximum image display area PN, it is not necessarily required to display these images. For example, it is also possible for the image setting section 165 to display the image corresponding to the operation object thus set, and then perform the control corresponding to the gesture detected without displaying the image corresponding to the determination object and the gesture instruction image.

Although in the present embodiment, the distance measurement section 166 measures the distance between the image display section 20 and the tentative object using the infrared LED 64 and the TOF sensor 63, it is not necessarily required to measure the distance, and further, the distance can also be measured using other methods. For example, it is also possible for the image setting section 165 to set all of the tentative objects detected by the image determination section 168 as the selectable operation objects irrespective of the distance between the image display section 20 and the operation object. Further, it is also possible for the distance measurement section 166 to compare the images of the operation objects imaged by a stereo camera with each other to thereby measure the distance between the image display section 20 and the operation object.

Although in the embodiments described above, the image determination section 168 detects the first finger FF1 of the right hand HD1 as the determination object, the determination object to be detected can variously be modified. For example, the determination object can be the control section 10, or can be a ballpoint pen or a stylus pen for operating the track pad 14 of the control section 10. Further, the determination object can also be a rod-like instrument for pointing on the extension of the first finger FF1, a specific shape of light in a laser pointer, an instrument (e.g., a flashlight) with a specific shape having a light emitting section, or the like. The presence or absence of the detection of the determination object can be determined by the presence or absence of the light emission so that the penlight in the light emission state is detected as the determination object while the penlight in the non-light emission state is not detected as the determination object. In the case in which whether or not the penlight is detected as the determination object is determined based on the presence or absence of the light emission, the detection of the penlight as the determination object higher in accuracy is performed. By operating the operation section 135, the determination object can arbitrarily be set by the user. Further, the determination object can be a wristwatch-type wearable device to be mounted on an arm of the user, a ring-like wearable device to be mounted on a finger of the user, or the like.

Further, the number of the determination objects to be detected is not limited to one, but can also be equal to or larger than two. For example, it is also possible that two fingers are detected as the determination objects, and the distance between the two fingers or the shapes of the two fingers are recognized instead of the gesture. For example, the gesture corresponding to pinch-in or pinch-out for performing the control of magnification or reduction of the display image can be detected due to the motion of the two fingers detected as the determination objects. As a similar operation by the two fingers, by setting the knob of the volume as the determination object and taking the knob between the two fingers to turn the knob, for example, clockwise, the volume to be output can be varied. Further, for example, in the case of operating the keyboard, as an alternate means of such an operation as to input a capital alphabet when selecting a specific character while holding down the Shift key, it is possible to detect a variety of types of input by detecting a relative motion of one finger with respect to the other finger in the positional relationship between the two fingers detected.

Although in the first embodiment described above, the image setting section 165 determines the check action of the meter MT1 using the combination of the gesture and the determination sound detected after performing the gesture, the determination sound is not necessarily required to be detected, and it is possible to determine the check action of the meter MT1 using only the gesture. Further, although the image setting section 165 detects the determination sound after performing the gesture to thereby determine the check action of the meter MT1, the timing of detecting the determination sound is not limited to the period after performing the gesture, but can be in the period before the gesture, and it is also possible to determine the check action using the determination sound detected while the gesture is being detected.

The object-correspondence virtual image in the appended claims broadly means the image displayed before some control or processing such as a selective image displayed in the maximum image display area PN, or an image suggesting the gesture necessary for proceeding to the next process. Further, the specific check image in the appended claims broadly means the image provided after some process or control based on the object-correspondence virtual image has been performed. The specific check image corresponds to the image for announcing the process and the control having been performed, or includes an image representing that the reception of some process has been confirmed. Therefore, in some cases, the same image corresponds to the object-correspondence virtual image, and at the same time corresponds to the specific check image. In contrast, even in the case of the same image, there are some cases in which the image corresponds to the object-correspondence virtual image, and some cases in which the image does not correspond to the object-correspondence virtual image in accordance with the circumstances in which the image is displayed.

D2. Modified Example 2

Figure 20:
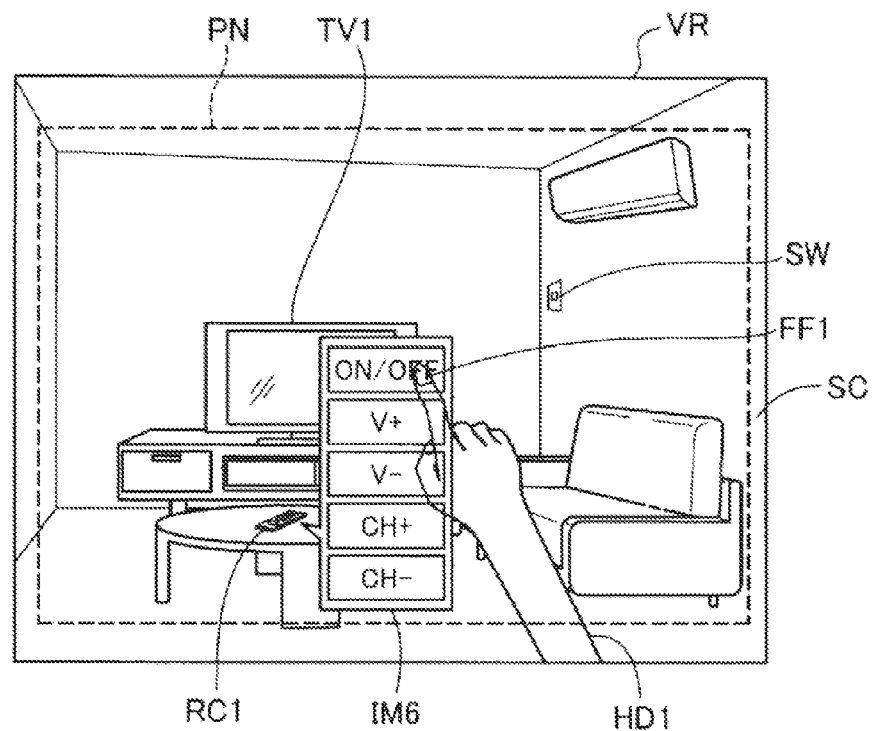
FIG. 20 is an explanatory diagram showing an example of a visual field to be visually recognized by the user in the case in which an icon of an image has been selected.

Although in the description of the second embodiment, there is explained the control in which the switch SW is set to the OFF state, in this modified example, the control performed in the case in which the icon displayed in the image IM6 corresponding to the remote controller RC1 is selected will be explained. FIG. 20 is an explanatory diagram showing an example of the visual field VR to be visually recognized by the user in the case in which the icon of the image IM6 has been selected. As shown in FIG. 20, the position of the first finger FF1 of the right hand HD1 overlaps the icon "ON/OFF" in the image IM6. In this case, the control processing section 314 switches between the ON state and the OFF state of the power of the television set TV1. In the example shown in FIG. 20, since the television set TV1 has been powered OFF before the position of the first finger FF1 overlaps the icon, when the position of the first finger FF1 overlaps the icon "ON/OFF" in the taken image, the control processing section 314 powers ON the television set TV1. Although the gesture image to be performed by the user is not displayed in this modified example as described above, in accordance with the position of the first finger FF1 varying after the image IM6 is displayed, the image setting section 165 transmits the control signal for operating the television set TV1 to the control device 300.

Although in the embodiments described above, the image determination section 168 detects whether or not the image of the operation object or the determination object is included in the taken image taken by the camera 61, the method of detecting the operation object or the determination object can variously be modified. For example, it is also possible for an infrared sensor or an ultrasonic sensor to detect the operation object or the determination object.

Further, it is also possible for a radar detector for detecting a radar wave to detect the operation object or the determination object.

D3. Modified Example 3

Although in the third embodiment described above, the wireless communication section 132b of the HMD 100b obtains the position information of the control apparatus and the controller of the control apparatus as the control devices 300b from the storage section 420 of the server 400, it is also possible that the position information to be obtained is only the position information of either one of the control apparatus and the controller. For example, in the case in which the control apparatus and the controller are integrated with each other, it is sufficient for the wireless communication section 132b to obtain the position information of either one of the control apparatus and the controller. Further, it is also possible that the position information of one of the control apparatus and the controller is obtained via the wireless communication section 132b, and the position information of the other is obtained by the image recognition as in the first embodiment and the second embodiment.

Although in the third embodiment described above, the image setting section 165 makes the image of the same corresponding markers are provided to the control apparatus thus detected and the controller of the control apparatus thus detected in the maximum image display area PN as shown in FIGS. 18 and 19, the corresponding markers to be displayed can variously be modified. For example, it is also possible to make the control apparatus and the controller be displayed in the maximum image display area PN as the images having the corresponding markers the same in shape, and different in color. Further, the character image such as "CONTROL APPARATUS" or "CONTROLLER" can be displayed in the maximum image display area PN. Further, the image of the arrow indicating both of the control apparatus and the controller can be displayed in the maximum image display area PN as the image representing the correspondence relationship between the control apparatus and the controller. Further, the distances to the control apparatus and the controller are measured as in the first and second embodiments, and it is possible for the image setting section 165 to make the images of the corresponding markers be displayed in the maximum image display area PN with the sizes of the images varied in accordance with the distances thus measured.

Although in the third embodiment described above, the external sensor 70 detects the acceleration as the change in the position of the external sensor 70, the physicality value to be detected as the change in the position can variously be modified. For example, the external sensor 70 can also be a gyro sensor for detecting the angular velocity. Further, the external sensor 70 does not need to have a rod-like shape, and can have such a shape as a ring to be mounted on a finger of the user or a wristwatch to be mounted on an arm of the user. Further, the external sensor 70 can be deformed, and it is also possible to measure the deformation amount of the external sensor 70 as the change in the position of the external sensor 70.

Although in the third embodiment described above, the camera 61 images the external sight, and the position identification section 163 corrects the position information of the control device 300b using the image of the control device 300b included in the taken image, it is not necessary required to image the external sight. The position of the control device 300b can also be identified based only on the position information obtained via the wireless communication section 132b.

Figure 21:
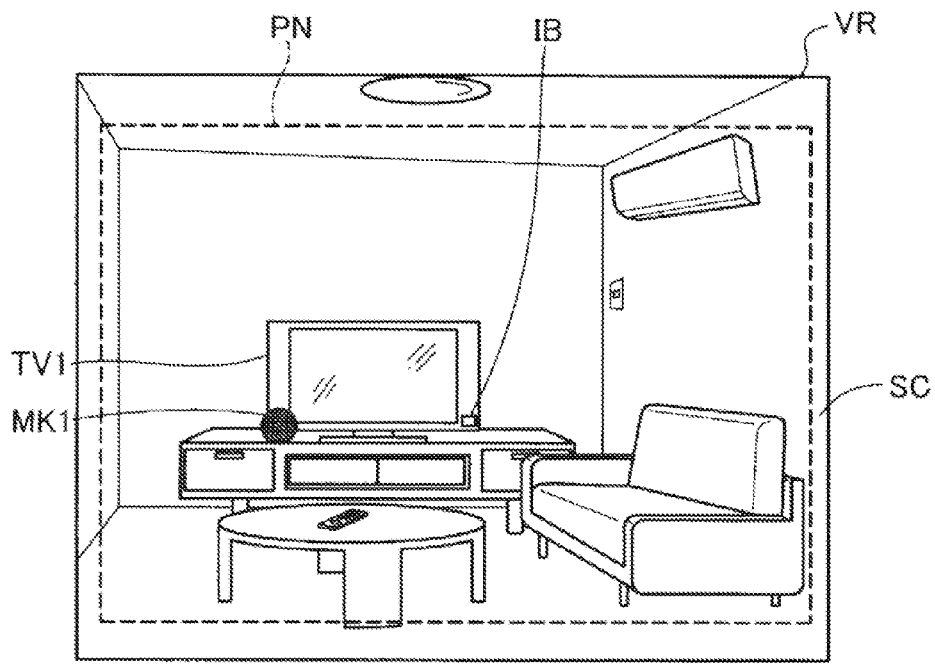
FIG. 21 is an explanatory diagram showing an example of a visual field to be visually recognized by the user in the case in which position information of a control apparatus has been obtained by iBeacon (a registered trademark).

FIG. 21 is an explanatory diagram showing an example of the visual field VR to be visually recognized by the user in the case in which position information of the control apparatus has been obtained by iBeacon (a registered trademark). FIG. 21 shows the visual field VR of the user for visually recognize the external sight SC including the image displayed in the maximum image display area PN in the case in which the HMD obtains the optical information, which has been transmitted from the information transmission section IB attached to the television set TV1 as the control apparatus, using the mechanism of iBeacon. In this modified example, the position identification section 163 obtains the position information of the television set TV1 not from the server 400, but from the information transmission section IB of the television set TV1. As described above, the position identification section 163 can obtain the position information of the control device 300b from other device using a variety of methods. As means for the communication, it is possible to use, for example, power line communication or the like.

Figure 22:
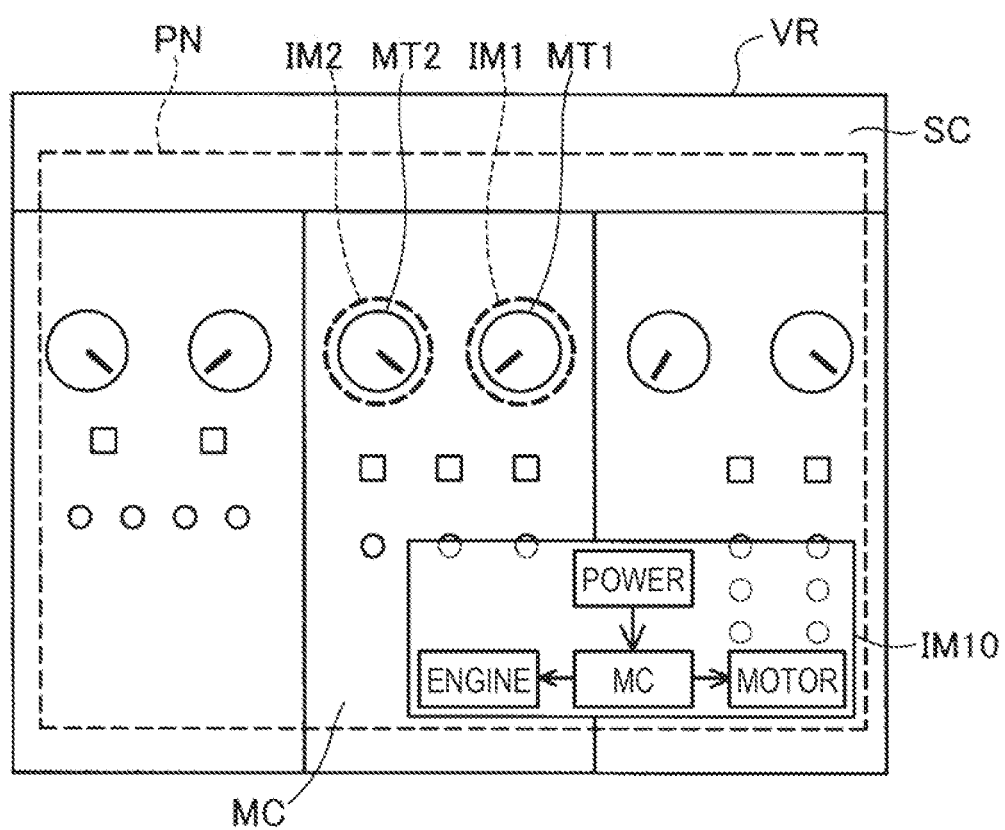
FIG. 22 is an explanatory diagram showing a visual field to be visually recognized by the user in the case in which an image has been displayed in the maximum image display area in accordance with a control instruction performed.

FIG. 22 is an explanatory diagram showing the visual field VR to be visually recognized by the user in the case in which an image IM10 has been displayed in the maximum image display area PN in accordance with the control instruction performed. In this modified example, the image setting section 165 makes the image associated with the control apparatus MC thus detected be displayed in the maximum image display area PN for each of the users identified by the identifying section 161. As shown in FIG. 22, the image IM10, which shows the relationship between the control apparatus MC and a peripheral device related to the control apparatus MC using a block diagram, is displayed in the maximum image display area PN. As described above, the image to be displayed in the maximum image display area PN with the control instruction thus executed can variously be modified.

Although in the third embodiment described above, the control instruction is executed based on the change in the position of the external sensor 70, the operation necessary for executing the control instruction can variously be modified. For example, it is also possible for the image setting section 165 to determine the control instruction to be executed based on the combination of the sound obtained via the microphone 69 and the change in the position of the external sensor 70 detected. In the HMD according to this modified example, since the control instruction is determined based on a plurality of elements, namely the sound and the change in the position of the external sensor 70, the user can input a larger number of operations, and thus, the usability for the user is improved.

Although in the embodiments described above, the image setting section 165 makes the image associated with the control instruction to be executed be displayed in the maximum image display area PN, it is not necessarily required to make the content associated with the control instruction be displayed in the maximum image display area PN as an image. For example, it is possible for the image setting section 165 to display the image representing the positions of the operation object detected and the determination object in the maximum image display area PN, but it is not required to display the image related to the control instruction to be executed in the maximum image display area PN.

It should be noted that selecting of the object in the appended claims includes selecting one from a plurality of selectable objects, and further includes selecting one from two alternatives, namely selecting and not selecting, with respect to the one selectable object thus detected.

D4. Modified Example 4

Although in the embodiments described above, the operation section 135 is provided to the control section 10, the configuration of the operation section 135 can variously be modified. For example, there can be adopted a configuration in which a user interface as the operation section 135 is disposed separately from the control section 10. In this case, since the operation section 135 is separated from the control section 10 provided with the power supply 130 and so on, and can therefore be miniaturized, and thus, the operability of the user is improved. Further, by providing a 10-axis sensor for detecting the motion of the operation section to the operation section 135 to thereby perform a variety of operations based on the motion thus detected, the user can instinctively operate the HMD 100.

For example, it is also possible for the image light generation section to have a configuration including an organic EL (organic electroluminescence) display and an organic EL control section. Further, the image generation section, for example, can also use a LCOS (Liquid Crystal On Silicon; LCoS is a registered trademark), a digital micromirror device, and so on instead of the LCD. Further, for example, it is also possible to apply the invention to a laser retinal projection head mounted display. In the case of the laser retinal projection type, the maximum image display area PN can be defined as an image area to be recognized by the eyes of the user.

Further, for example, the HMD 100 can also be formed as a head mounted display having a configuration in which each of the optical image display sections covers only a part of the eye of the user, in other words, a configuration in which each of the optical image display sections does not completely cover the eye of the user. Further, it is also possible to assume that the HMD 100 is a so-called monocular head mounted display.

Figure 23A:
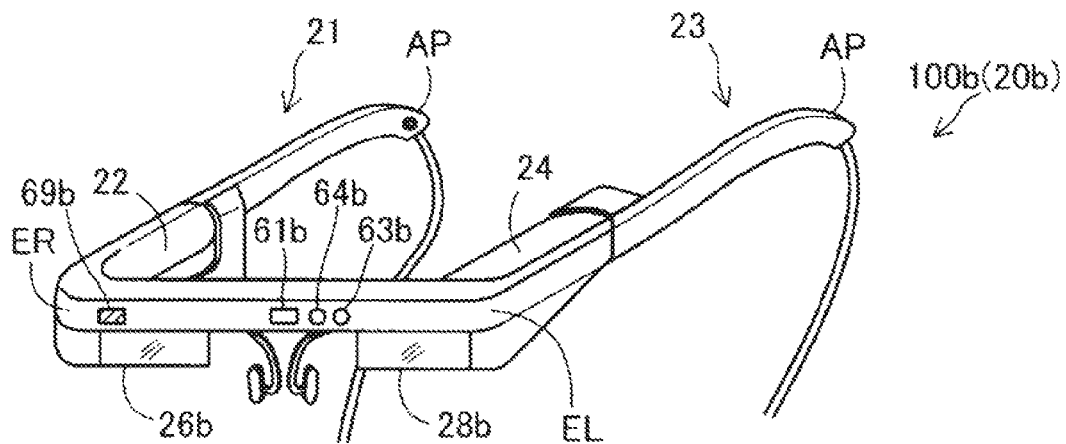
FIGS. 23A and 23B are explanatory diagrams each showing an exterior configuration of the HMD according to a modified example.
Figure 23B:
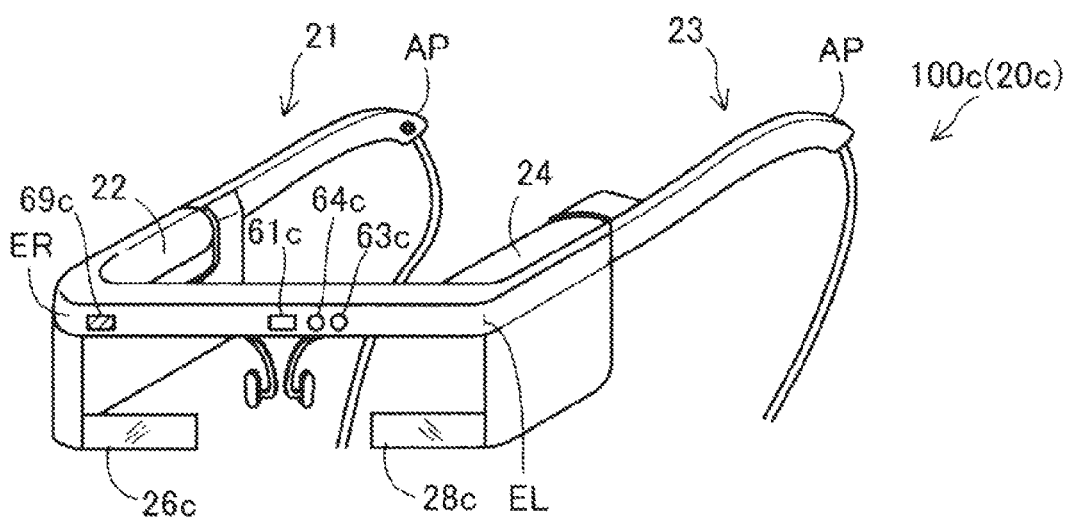

FIGS. 23A and 23B are explanatory diagrams each showing an exterior configuration of the HMD 100 according to a modified example. In the case of the example shown in FIG. 23A, the HMD 100 is different from the HMD 100 shown in FIG. 1 in the point that the image display section 20b is provided with a right optical image display section 26b instead of the right optical image display section 26, and the point that the left optical image display section 28b is provided instead of the left optical image display section 28. The right optical image display section 26b is formed to be smaller than the optical member of the embodiment described above, and is disposed obliquely above the right eye of the user when wearing the HMD 100b. Similarly, the left optical image display section 28b is formed to be smaller than the optical member of the embodiments described above, and is disposed obliquely above the left eye of the user when wearing the HMD 100b. In the case of the example shown in FIG. 23B, the differences from the HMD 100 shown in FIG. 1 are the point that the image display section 20c is provided with a right optical image display section 26c instead of the right optical image display section 26, and the point that the left optical image display section 28c is provided instead of the left optical image display section 28. The right optical image display section 26c is formed to be smaller than the optical member of the embodiments described above, and is disposed obliquely below the right eye of the user when wearing the head mounted display. The left optical image display section 28c is formed to be smaller than the optical member of the embodiments described above, and is disposed obliquely below the left eye of the user when wearing the head mounted display. As described above, it is sufficient for each of the optical image display sections to be disposed in the vicinity of the eye of the user. Further, the size of the optical member forming the optical image display sections is determined arbitrarily, and it is possible to realize the HMD 100 having a configuration in which the optical image display sections each cover only apart of the eye of the user, in other words, the configuration in which the optical image display sections each do not completely cover the eye of the user.

Further, as the earphones, an ear hook type or a headband type can be adopted, or the earphones can be eliminated. Further, it is also possible to adopt a configuration as the head-mounted display installed in a mobile object such as a vehicle or a plane. Further, it is also possible to adopt a configuration as the head mounted display incorporated in a body protector such as a helmet.

The configurations of the HMD 100 in the embodiments described above are illustrative only, and can variously be modified. For example, it is also possible to eliminate one of the direction keys 16 and the track pad 14 provided to the control section 10, or to provide another operating interface such as an operating stick in addition to or instead of the direction keys 16 and the track pad 14. Further, it is also possible to assume that the control section 10 has a configuration in which an input device such as a keyboard or a mouse is connected to the control section 10, and receives an input from the keyboard or the mouse.

Further, it is also possible to adopt an image display section of another system such as an image display section to be worn like a hat as the image display section instead of the image display section 20 to be worn like a pair of glasses. Further, the earphones 32, 34 can arbitrarily be omitted.

Further, in the embodiments described above, it is also possible to assume that the HMD 100 guides the image light beams representing the same image to the right and left eyes of the user to thereby make the user visually recognize a two-dimensional image, or to assume that the head-mount type display device 100 guides the image light beams representing respective images different from each other to the right and left eyes of the user to thereby make the user visually recognize a three-dimensional image.

Further, in the embodiments described above, it is also possible to replace a part of the configuration realized by hardware with software, or by contraries, to replace a part of the configuration realized by software with hardware. For example, although in the embodiments described above, it is assumed that the image processing section 160 and the sound processing section 170 are realized by the CPU 140 retrieving and then executing the computer program, it is also possible to assume that these functional sections are realized by hardware circuits. For example, some of the constituents provided to the control section 10 according to the embodiments described above can also be configured using an application specific integrated circuit (ASIC) designed to realize the function of the invention.

Further, in the case in which a part or the whole of the function of the invention is realized by software, the software (the computer program) can be provided in a form of being stored in a computer-readable recording medium. In the invention, the "computer-readable recording medium" is not limited to a portable recording medium such as a flexible disk or a CD-ROM, but includes an internal storage device in the computer such as a variety of types of RAM or ROM, and an external storage device fixed to the computer such as a hard disk drive.

Further, although in the embodiment described above, the control section 10 and the image display section 20 are formed as the separate constituents as shown in FIGS. 1 and 2, the configuration of the control section 10 and the image display section 20 is not limited to this configuration, but can variously be modified. For example, the configuration formed in the control section 10 can be formed inside the image display section 20 in whole or in part. Further, it is also possible to adopt a configuration in which the power supply 130 in the embodiment described above is formed alone, and can be replaced, or the configuration provided to the control section 10 can redundantly be provided to the image display section 20. For example, the CPU 140 shown in FIG. 2 can also be provided to both of the control section 10 and the image display section 20, and it is also possible to adopt a configuration in which the functions respectively performed by the CPU 140 provided to the control section 10 and the CPU provided to the image display section 20 are separated from each other.

Further, it is also possible to adopt a configuration of a wearable computer in which the control section 10 and the image display section 20 are integrated with each other, and can be attached to the clothes of the user.

The invention is not limited to the embodiments and the modified examples described above, but can be realized with a variety of configurations within the scope or the spirit of the invention. For example, the technical features in the embodiments and the modified examples corresponding to the technical features in the aspects described in SUMMARY section can arbitrarily be replaced or combined in order to solve all or a part of the problems described above, or in order to achieve all or a part of the advantages described above. Further, the technical feature can arbitrarily be eliminated unless described in the specification as an essential element.

The entire disclosure of Japanese Patent Application Nos. 2014-094613, filed May 1, 2014 and 2015-024971, filed Feb. 12, 2015 are expressly incorporated by reference herein.

What is claimed is:

1. A head-mounted display device comprising:
   a camera;
   a see-through display configured to display virtual imagery, and capable of transmitting external light through the see-through display; and
   a processor or circuit configured to:
      control the camera to continuously acquire images, and while the camera is continuously acquiring images:
      detect, by image processing, whether or not the acquired images include image data that is the same as image data of an operation object stored in a memory; and
      if the acquired images include image data that is the same as the image data of the stored operation object:
         control the see-through display to display a virtual image associated with the operation object;
         detect, by image processing, a gesture associated with the operation object; and
         when the gesture associated with the operation object has been detected, control the see-through display to display a specific check image associated with the operation object.

2. The head-mounted display device according to claim 1, wherein the processor or circuit is farther configured to:
   obtain the position of a specific object;
   detect the gesture associated with the operation object based on the obtained position of the specific object; and
   when the gesture has been detected, execute a control instruction associated with operation object.

3. The head-mounted display device according to claim 2, wherein the processor or circuit is further configured to: control the see-through display to display a gesture instruction associated in advance with a combination of the obtained position of the specific object and an obtained position of the detected operation object.

4. The head-mounted display device according to claim 3, wherein the processor or circuit is further configured to: control the see-through display to display a virtual image representing the change in the position of the specific object necessary for executing the control of the operation object as the gesture instruction.

5. A control system comprising:
   the head-mounted display device according to claim 4; and
   a server processor configured to:
      identify the operation object;
      transmit information about the identified operation object; wherein the processor or circuit of the head-mounted display device is further configured to:
         receive the transmitted information about the identified operation object, and
         transmit information about the control of the operation object so that the server processor can execute control based on the transmitted information about the control of the operation object.

6. A control system comprising:
   The head-mounted display device according to claim 3; and a server processor configured to:
   identify the operation object; and transmit information about the identified operation object; wherein the processor or circuit of the head-mounted display device is further configured to:
   receive the transmitted information about the identified operation object; and transmit information about control of the operation object so that the server processor can execute control based on the transmitted information about the control of the operation object.

7. The head-mounted display device according to claim 2, wherein the processor or circuit is further configured to: control the see-through display to display a virtual image representing a content of the control of the operation object to be executed.

8. The head-mounted display device according to claim 2, wherein the processor or circuit is further configured to: in a case in which the position of the specific object has changed and the specific object and operation object have positions that overlap each other, determine that the gesture associated with the operation object has been detected.

9. The head-mounted display device according to claim 2, further comprising: a sensor configured to measure a distance between the operation object and the see-through display, wherein the processor or circuit is further configured to: set the operation object as a selectable object, in a case that the measured distance between the operation object and the see-through display is equal to or shorter than a threshold value.

10. The head-mounted display device according to claim 2, further comprising: a sound acquisition device adapted to obtain an external sound, wherein the processor or circuit is further configured to: determine the control of the operation object based on a combination of the change in the position of the specific object identified and the sound obtained by the sound acquisition device.

11. A control system comprising:
The head-mounted display device according to claim 2; and a server processor configured to:
identify the operation object; and transmit information about the identified operation object; wherein the processor or circuit of the head-mounted display device is further configured to:
receive the transmitted information about the identified operation object, and transmit information about control of the operation object so that the server processor can execute control based on the transmitted information about the control of the operation object.

12. The head-mounted display device according to claim 1, wherein the processor or circuit is further configured to obtain position information of the operation object from another device.

13. The head-mounted display device according to claim 12, wherein the processor or circuit is further configured to: in a case in which the detected operation object fails to be included in the external light, control the see-through display to display a positional relationship between the see-through display and the detected operation object.

14. The head-mounted display device according to claim 1, wherein the processor of circuit is further configured to:
detect an acceleration of a specific object, and
identify a change in the position of the specific object based on the detected acceleration of the specific object.

15. The head-mounted display device according to claim 14, further comprising: a sound acquisition device configured to obtain an external sound, wherein the processor or circuit is further configured to: determine the control of the operation object, based on the obtained external sound and a identified change in the position of the specific object.

16. The head-mounted display device according to claim 1, wherein the processor or circuit is further configured to:
execute control of a control device associated with the operation object, and
in a case in which the operation object and the control device are both within the external light, control the see-through display to display a virtual image indicating that the operation object and the control device are in a correspondence relationship.

17. The head-mounted display device according to claim 16, wherein the processor or circuit is further configured to: control the see-through display to display virtual images having identical shapes and identical colors as the virtual image indicating that the operation object and the control device are in the correspondence relationship.

18. The head-mounted display device according to claim 1, wherein the processor or circuit is further configured to:
identify an attribute of a user of the head-mounted display device, and
control the see-through display to display at least one of a virtual image associated with the operation object and the specific check image as the virtual image so as to correspond to the attribute identified.

19. The head-mounted display device according to claim 1, further comprising a memory that stores two or more pieces of image data corresponding to two or more operation objects, respectively.

20. The head-mounted display device according to claim 1, wherein the processor or circuit is further configured to:
determine whether the operation object is located within a predetermined distance range from the see-through display; and
if the operation object is located within the predetermined distance range: display the virtual image associated with the operation object.

21. A method of controlling a transmissive-type head-mounted display device including a see-through display configured to display virtual imagery, and capable of transmitting external light through the see-through display, the method comprising:
controlling a camera of the head-mounted display device to continuously acquire images, and while the camera is continuously acquiring images:
detecting, by image processing, whether or not the acquired images include image data that is the same as image data of an operation object stored in a memory; and
if the acquired images include image data that is the same as the image data of the stored operation object:
controlling the see-through display to display a virtual image associated with the operation object;
detecting, by image processing, a gesture associated with the operation object; and
when the gesture associated with the operation object has been detected, controlling the see-through display to display a specific check image associated with the operation object.

22. A non-transitory computer readable medium storing computer-executable program instructions used with a head-mounted display device including a see-through display configured to display virtual imagery and capable of transmitting external scenery through the see-through display, the computer-executable program instructions, when executed by a processor of the head-mounted display device, cause the processor to:
control a camera of the head-mounted display device to continuously acquire images, and while the camera is continuously acquiring images:
detect, by image processing, whether or not the acquired images include image data that is the same as image data of an operation object stored in a memory; and
if the acquired images include image data that is the same as the image data of the stored operation object:
control the see-through display to display a virtual image associated with the operation object;
detect, by image processing, a gesture associated with the operation object; and
when the gesture associated with the operation object has been detected, controlling the see-through to display a specific check image associated with the operation object.

* * * * *